(12) United States Patent
Acar et al.

(10) Patent No.: US 10,963,794 B2
(45) Date of Patent: *Mar. 30, 2021

(54) CONCEPT ANALYSIS OPERATIONS UTILIZING ACCELERATORS

(71) Applicant: International Business Machines Corporation, Armonk, NY (US)

(72) Inventors: Emrah Acar, Montvale, NJ (US); Rajesh R. Bordawekar, Yorktown Heights, NY (US); Michele M. Franceschini, White Plains, NY (US); Luis A. Lastras-Montano, Cortlandt Manor, NY (US); Ruchir Puri, Baldwin Place, NY (US); Haifeng Qian, White Plains, NY (US); Livio B. Soares, New York, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/530,206

(22) Filed: Aug. 2, 2019

(65) Prior Publication Data

US 2019/0354878 A1 Nov. 21, 2019

Related U.S. Application Data

(63) Continuation of application No. 14/682,676, filed on Apr. 9, 2015, now Pat. No. 10,373,057.

(51) Int. Cl.
*G06N 5/00* (2006.01)
*G06N 5/02* (2006.01)
(Continued)

(52) U.S. Cl.
CPC ....... *G06N 5/022* (2013.01); *G06F 16/24569* (2019.01); *G06F 16/36* (2019.01)

(58) Field of Classification Search
CPC ...... G06F 16/24569; G06F 16/36; G06N 5/00
See application file for complete search history.

(56) References Cited

U.S. PATENT DOCUMENTS

| 6,546,120 B1 * | 4/2003 | Etoh | ................... G06T 7/20 348/154 |
|---|---|---|---|
| 7,688,748 B2 | 3/2010 | Jiang | |

(Continued)

FOREIGN PATENT DOCUMENTS

CN 102737112 A 10/2012

OTHER PUBLICATIONS

"List of IBM Patents or Patent Applications Treated as Related", Jul. 31, 2019, 2 pages.

(Continued)

*Primary Examiner* — Diedra McQuitery
(74) *Attorney, Agent, or Firm* — Stephen R. Tkacs; Stephen J. Walder, Jr.; Ingrid M. Foerster

(57) ABSTRACT

Mechanisms, in a system comprising a host system and at least one accelerator device, for performing a concept analysis operation are provided. The host system extracts a set of one or more concepts from an information source and provides the set of one or more concepts to the accelerator device. The host system also provides at least one matrix representation data structure representing a graph of concepts and relationships between concepts in a corpus. The accelerator device executes the concept analysis operation internal to the accelerator device to generate an output vector identifying concepts in the corpus, identified in the at least one matrix representation data structure, related to the set of one or more concepts extracted from the information source. The accelerator device outputs the output vector to (Continued)

the host system which utilizes the output vector to respond to a request submitted to the host system associated with the information source.

20 Claims, 11 Drawing Sheets

(51) Int. Cl.
  *G06F 16/36* (2019.01)
  *G06F 16/245* (2019.01)

(56) References Cited

U.S. PATENT DOCUMENTS

| | | | |
|---|---|---|---|
| 8,250,069 B2 | 8/2012 | Jandhyala | |
| 8,751,556 B2 | 6/2014 | Song | |
| 8,775,495 B2 | 7/2014 | Lumsdaine et al. | |
| 2009/0178042 A1 | 7/2009 | Mehta et al. | |
| 2009/0287678 A1 | 11/2009 | Brown et al. | |
| 2011/0029756 A1 | 2/2011 | Biscondi et al. | |
| 2011/0066587 A1 | 3/2011 | Ferrucci et al. | |
| 2011/0125734 A1 | 5/2011 | Duboue et al. | |
| 2012/0022841 A1 | 1/2012 | Appleyard | |
| 2012/0259843 A1* | 10/2012 | Child | G06F 16/24569 707/722 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0110861 A1 | 5/2013 | Roy et al. | |
| 2013/0142289 A1* | 6/2013 | Fanous | H03M 13/3927 375/341 |
| 2014/0108481 A1 | 4/2014 | Davis et al. | |
| 2014/0298351 A1* | 10/2014 | Usui | G06F 17/16 718/107 |
| 2015/0113031 A1 | 4/2015 | Reinwald et al. | |
| 2015/0254312 A1* | 9/2015 | Roy | G06F 16/3338 707/722 |
| 2015/0324125 A1 | 11/2015 | Li et al. | |
| 2016/0140084 A1 | 5/2016 | Daga et al. | |

OTHER PUBLICATIONS

"Sparse Matrix", Wikipedia, http://en.wikipedia.org/wiki/Sparse_matrix#Compressed_row_Storage_.28CRS_or_CSR.29, last modified on Feb. 19, 2015, accessed on Feb. 26, 2015, 8 pages.

"Stanford Personalized PageRank Project", Stanford University, The Stanford Natural Language Processing Group, http://nlp.stanford.edu/projects/pagerank.shtml, accessed on Feb. 26, 2015, 2 pages.

Baskaran, Muthu M. et al., "Optimizing Sparse Matrix-Vector Multiplication on GPUs", IBM Research Division, IBM Research Report, Apr. 2, 2009, 12 pages.

Cheung, Shun Yan, "Working with Sparse Matrices", Emory University, Mathematics and Computer Science Course Syllabus, http://www.mathcs.emory.edu/~cheung/Courses/561/Syllabus/3-C/sparse.html, accessed on Feb. 26, 2015, 7 pages.

High, Rob, "The Era of Cognitive Systems: An Inside Look at IBM Watson and How it Works", IBM Corporation, Redbooks, Dec. 12, 2012, 16 pages.

Li, Jiajia et al., "SMAT: An Input Adaptive Auto-Tuner for Sparse Matrix-Vector Multiplication", ACM, PLDI'13, Seattle, WA, Jun. 16-19, 2013, pp. 117-126.

Matam, Kiran K. et al., "Accelerating Sparse Matrix Vector Multiplication in Iterative Methods Using GPU", IEEE, 2011 International Conference on Parallel Processing, Sep. 13, 2011, pp. 612-621.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

\* cited by examiner

```
MATRIX VECTOR MULTIPLY KERNEL:
Y(I) = Y(I) + A(I,J)*X(J)

FOR EACH ROW I
    FOR K = PTR[I] TO PTR[I+1] DO
        Y[I] = Y[I] + VAL[K]*X[IND[K]]
```

1

CONCEPT ANALYSIS OPERATIONS UTILIZING ACCELERATORS

BACKGROUND

The present application relates generally to an improved data processing apparatus and method and more specifically to mechanisms for performing concept analysis operations utilizing accelerators.

Everyday life is dominated by information technology and systems for obtaining information and knowledge from collections of data. For example, search engines operate on large collections of data to obtain information related to a search query. Question and Answer (QA) systems, such as the IBM Watson™ QA system available from International Business Machines (IBM) Corporation of Armonk, N.Y., operate on a corpus of documents or other portions of information to answer natural language questions. Moreover, many social networking services represent their users, communications, and the like, as large data sets. Many times it is important to perform knowledge extraction, reasoning, and various other analytics on these large scale data sets so as to facilitate the operation of the systems, e.g., answer questions, return search results, or provide functionality within the social networking services. For example, many social networking services help individuals identify other registered users that they may know or have a connection with. Such functionality requires analyzing a large set of data representing the users of the social networking service.

In facilitating searching of information in large sets of documents, such as searches of the web pages on the Internet (or the "web"), search engines are employed which rank results based on various factors. One such search engine is the Google™ search engine which uses a ranking algorithm referred to as "PageRank." PageRank exploits the linkage structure of the web to compute global "importance" scores that can be used to influence the ranking of search results.

Recently, an effort at Stanford University, as part of their Stanford Global Infobase Project, has developed an algorithm for allowing users to define their own notion of importance for each individual query. This algorithm, referred to as personalized PageRank, provides online personalized web searching with personalized variants of PageRank based on a private, personalized profile.

SUMMARY

In one illustrative embodiment, a method, in a system comprising a host system having a processor and a memory, and at least one accelerator device, for performing a concept analysis operation is provided. The method comprises extracting, by the host system, a set of one or more concepts from an information source and providing, by the host system, the set of one or more concepts to the accelerator device. Moreover, the method comprises providing, by the host system, at least one matrix representation data structure representing a graph of concepts and relationships between concepts in a corpus. In addition, the method comprises executing, by the accelerator device, the concept analysis operation internal to the accelerator device to generate an output vector identifying concepts in the corpus, identified in the at least one matrix representation data structure, related to the set of one or more concepts extracted from the information source. The method also comprises outputting, by the accelerator device, the output vector to the host system, wherein the host system utilizes the output vector to respond to a request submitted to the host system associated with the information source.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise a host system having one or more processors and a memory coupled to the one or more processors and an accelerator device. The memory may comprise instructions which, when executed by the one or more processors, cause the one or more processors to perform various ones of, and combinations of, the operations outlined above with regard to the method illustrative embodiment and attributed to the host system. Other operations attributed to the accelerator device are performed internal to the accelerator device with the accelerator device outputting an output vector to the host system.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

Figure 9:
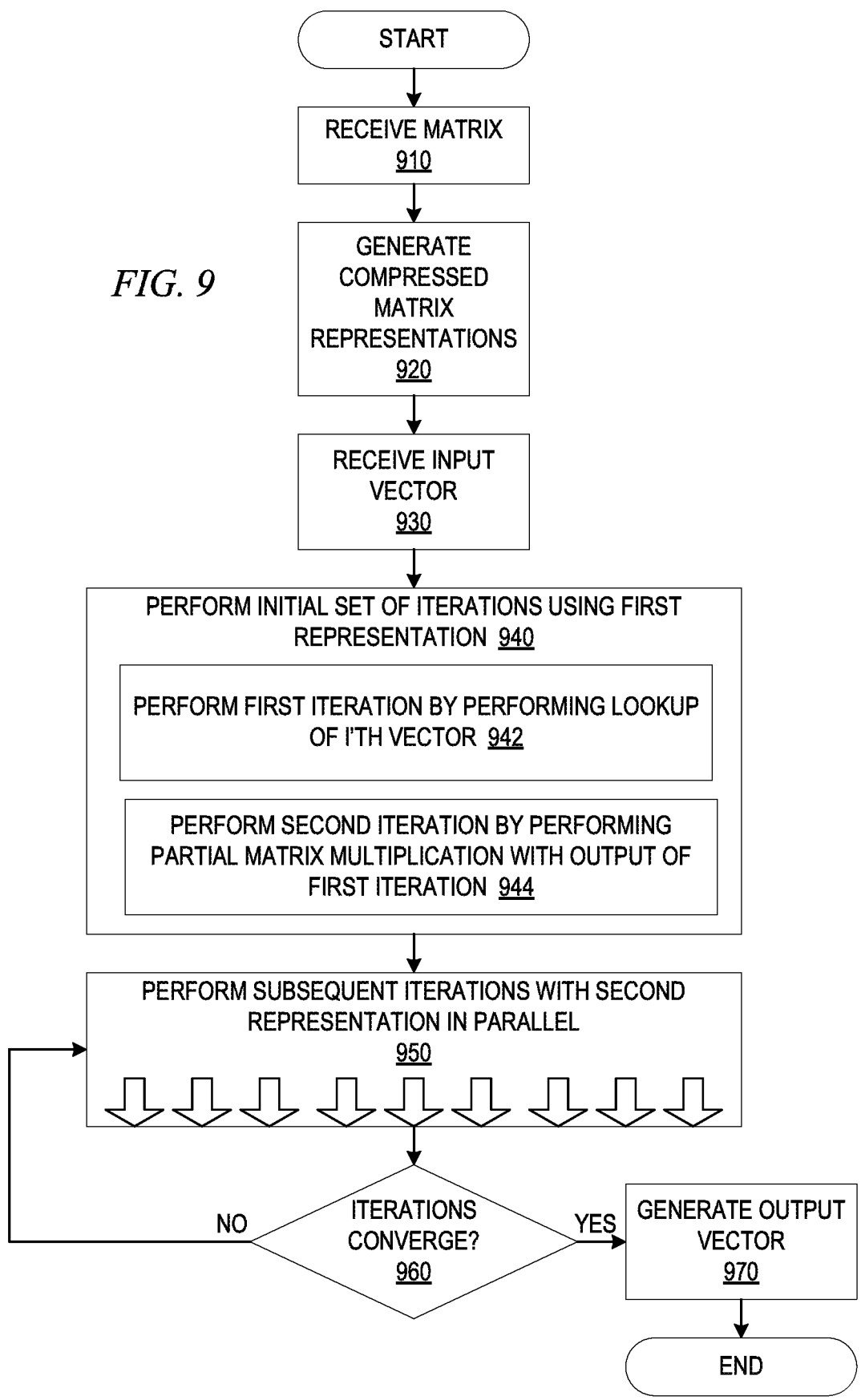
Figure 10:
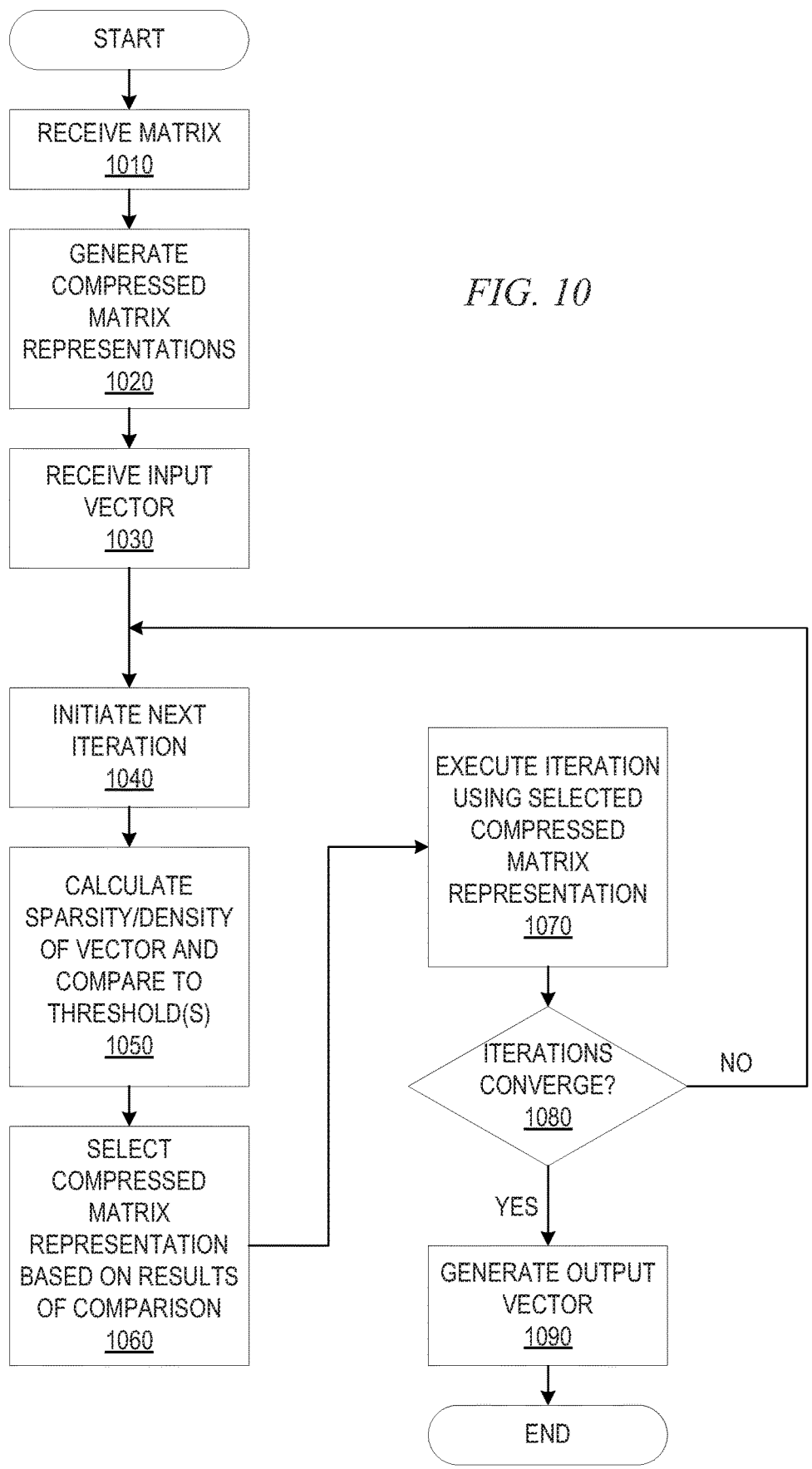
Figure 11:
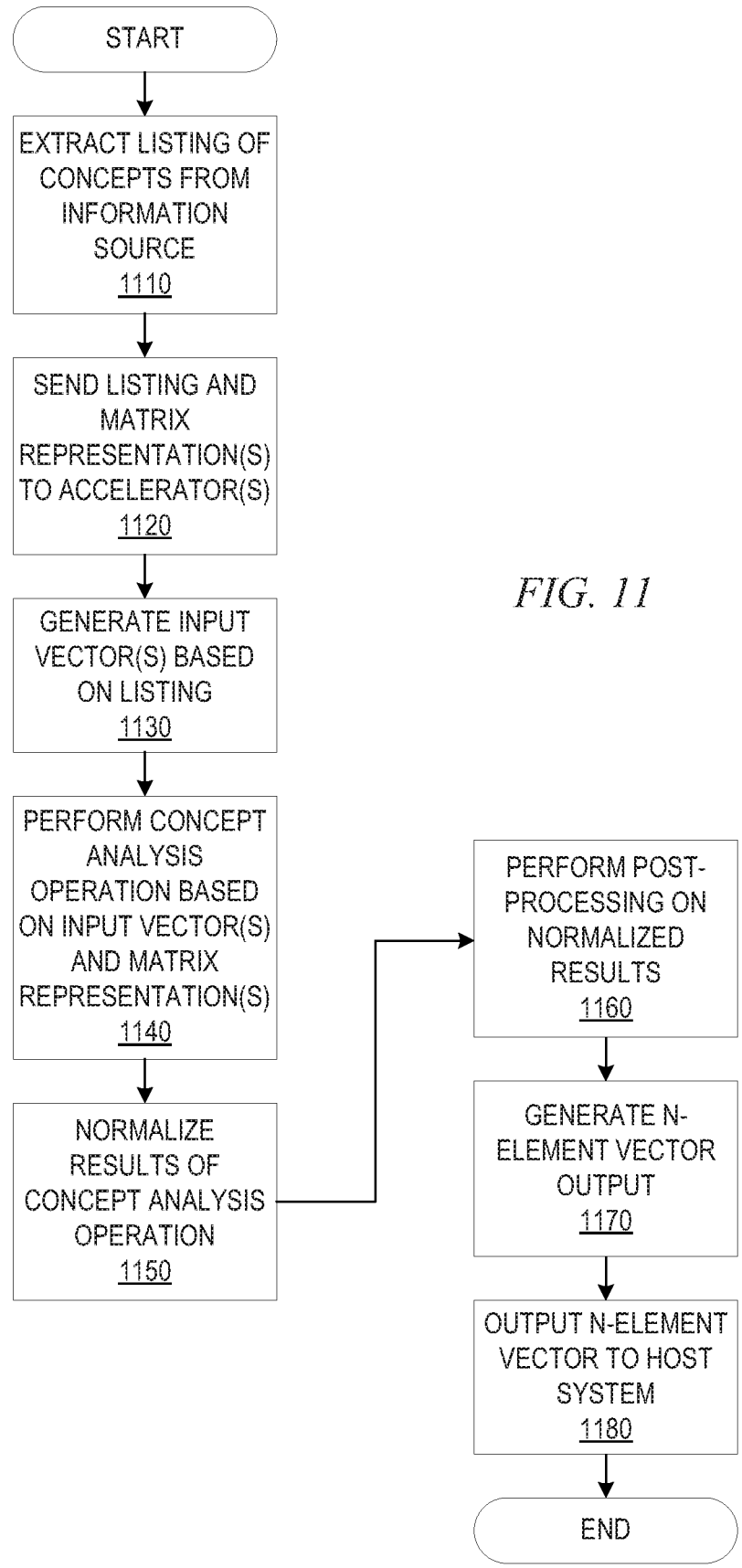

formatted data structure of a matrix along with sample pseudo-code for performing the partial matrix vector multiplication operations;

FIG. 9 is a flowchart outlining an example hybrid representation matrix vector multiplication operation in accordance with one illustrative embodiment;

FIG. 10 is a flowchart outlining an example operation for dynamically modifying the compressed matrix representation utilized for iterations of a matrix operation based on a determination of the sparsity/density of an input vector using a hybrid matrix representation mechanism in accordance with one illustrative embodiment; and FIG. 11 is a flowchart outlining an example operation for performing a concept analysis operation utilizing one or more accelerator devices in accordance with one illustrative embodiment.

DETAILED DESCRIPTION

As discussed above, modern computing systems often are engaged in performing knowledge extraction, reasoning, and various other analytical operations on large scale data sets. Search engines, Question and Answer systems, Natural Language Processing (NLP) systems, relationship analytics engines, and the like, are only some examples of these types of modern computing systems which operate on large scale data sets to facilitate their operations. Often times these systems operate on identified concepts in portions of information, e.g., electronic documents, web pages, data files, or the like, referred to collectively as a corpus of information.

These concepts may be represented as networks or graphs comprising nodes and edges, where the nodes represent the concepts themselves and the edges represent relationships between the concepts identified in the corpus. The edges may be uni-directional or bi-directional and may have associated weights or strengths which represent how strongly one concept (node) associated with the edge is determined to be related to another concept (node) associated with the edge. In one illustrative embodiment, the sum of all weights on every outgoing edge stemming from a node is 1.0. It should also be noted that with such graphs, there may be "self-edges" or "self-links", which are edges that point back to the node from which they originated. It can be appreciated that with a large corpus of information, such as the Wikipedia™ website for example, the complexity and size of such networks/graphs becomes very large as well.

In order to perform knowledge extraction, reasoning, and other analytical operations on such large scale data sets (i.e. networks/graphs), these networks/graphs are often represented as matrices in which the indices of the matrix represent the nodes of the network/graph, and entries at the rows/columns of the matrix represent whether or not the nodes have an edge connecting them to each other, i.e. whether or not the nodes have a relationship with one another. A non-zero value in the entry at the intersection of a row/column indicates a relationship being present between the concepts corresponding to the indices while a zero value indicates that there is no relationship between the concepts. The strength of a relationship between the concepts is measured by the value of the entry, e.g., higher values are indicative of stronger relationships between the concepts represented y the intersecting row/column indices. The weights or strengths of the edges may be constant during a matrix operation performed on the matrix but may change due to dynamic events or updates happening in real time between matrix operations.

As can be appreciated, with large scale data sets and corresponding large scale networks/graphs, the matrices representing these networks/graphs are large sparse matrices which may have millions or even billions of nodes and corresponding edges. These matrices are sparse in that the majority of the entries in the matrix have zero-values (dense matrices have a majority of values being non-zero). In one illustrative embodiment, the properties of such a matrix are as follows:

The nodes correspond to concepts, entities, information, search terms of interest, or the like.

The edges are unidirectional in the graph and an entry in column j, row i corresponds to the weight (or strength) of the edge from node j to node i.

The sum of all out-going edges (including self-edges) is 1.0 and thus, the sum of each column in the corresponding matrix is 1.0.

The matrix is square and sparse.

It should be appreciated that these are properties of just one example large sparse matrix upon which the mechanisms of the illustrative embodiments may operate but is not intended to be limiting of the types of matrices upon which the illustrative embodiments may operate. To the contrary, as will be apparent to those of ordinary skill in the art in view of the present description, the mechanisms of the illustrative embodiments may be implemented with, and may operate on, other types of matrices having different properties than those mentioned in the example set of properties above.

Matrix operations are performed on these large scale matrices to extract relationships between the entries in the matrices so as to glean knowledge, perform reasoning operations, or the like. For example, if a process wants to know what concepts are related to concept A (e.g., a search term concept or concept in an information source, such as an online encyclopedia or the like), concept A may be represented as an index (column and/or row) in the matrix (and may be specified by way of an input vector for example), and other concepts may be represented as other indices in the matrix, organized into rows and columns. Intersections of rows and columns in the matrix have values that are set to non-zero values if column A is related to the other concept, e.g., if concept A is represented as an index in a row, indices along the columns may represent other concepts and the intersection of each column with concept A represents whether or not concept A is related to the other concept (non-zero if concept A is related to the other concept and zero if concept A is not related to the other concept). Again, "relations" between concepts are represented in the graph by edges and associated weights/strengths of the edges such that the zero or non-zero value in the matrix is the weight/strength of the edge between concept A and the other concept.

Most matrix operations for knowledge extraction, information extraction, concept analysis, or other analysis operations directed to identifying relationships between nodes of a graph using matrix representations, involve a matrix vector multiplication operation in which the matrix is multiplied by a vector which results in an output indicative of the intersection of the vector with the matrix, e.g., non-zero values in the vector multiplied with non-zero values in the matrix result in non-zero values in the output indicative of a relationship between the corresponding vector element and the matrix index. The sparsity of the matrix and the sparsity of the vector both influence the efficiency by which this matrix vector multiplication operation can be accomplished due to limited size of cache memories.

Because these large scale matrices tend to be very sparse, the processes executing on these sparse matrices often involve many runtime resource-intensive large sparse matrix operations each comprising matrix vector multiplication operations. When a matrix vector multiplication operation is performed, portions of the matrix are loaded speculatively so as to perform the matrix vector multiplication. A portion of the matrix/vector is loaded into cache memory and used to perform a partial product multiplication of the matrix/vector. When a particular entry or location in the matrix is loaded into the cache, other entries or locations in close proximity to the selected entry/location are also loaded to speculate that the next matrix vector multiplication will target an entry/location in close proximity to the selected entry/location. However, in a sparse matrix, this speculative loading of the cache memory, more often than not, results in a cache miss, i.e. the non-zero entry or location of interest is not present in the cache memory and must be loaded from main memory or storage. Hence, sparse matrices/vectors, along with limited size cache memories results in cache misses which affect performance.

Thus, it can be appreciated that a process to identify related concepts, or perform other knowledge or information extraction on a large scale data set, may be very resource intensive involving a large number of cache misses and thus, loadings from main memory or storage, as the size of the matrix and the sparsity of the matrix increases. This is also the case when the vector is sparse since the matrix vector multiplication operation essentially is looking for non-zero entries in the matrix with which the non-zero elements of the vector are multiplied and if the vector and matrix are sparse, the majority of entries/elements will be zero when loaded into the cache memory. Therefore, the efficiency by which functionality of the system is provided may be limited by the efficiency and speed of performing the matrix operations on these large scale data sets.

In addition, because of the large size of the matrix, it becomes difficult to maintain the entire matrix in memory for use with matrix operations. Thus, various mechanisms have been devised for representing the matrix in a compressed format. For example, formats for representing matrices based on the non-zero values in the matrix have been devised which significantly reduce the size of the memory required to maintain information about the matrix. For example, the Compact Sparse Row (CSR) and Compact Sparse Column (CSC) storage formats provide examples of such. However, each of these formats are more or less efficient for different types of input vector sparsities (or densities).

International Business Machines (IBM) Corporation of Armonk, N.Y. has developed mechanisms for addressing the issues with regard to cache efficiency during large sparse matrix operations and the utilization of different storage formats for large scale matrices. For example, U.S. patent application Ser. No. 14/611,297, entitled "Matrix Ordering for Cache Efficiency in Performing Large Sparse Matrix Operations", filed Feb. 2, 2015, which is hereby incorporated by reference, provides a mechanism for re-ordering a matrix to concentrate non-zero values of the matrix along the diagonal of the matrix by use of a clustering approach. Moreover, U.S. patent application Ser. No. 14/635,007, entitled "Parallelized Hybrid Sparse Matrix representations for Performing Personalized Content Ranking", filed Mar. 2, 2015, which is hereby incorporated by reference, provides mechanisms for selecting different storage formats of a large scale matrix for use during different iterations of a matrix operation based on the sparsity (or density) of a vector being used in the matrix operation during the particular iteration.

These mechanisms are directed to improving the way in which the matrix operation itself is performed by modifying the way in which the matrix is represented or used within the matrix operation. These mechanisms may be used in conjunction with further mechanisms provided by the illustrative embodiments set forth herein to provide a more efficient concept analysis mechanism for analyzing relationships between concepts represented in large scale sparse matrices for purposes of performing knowledge extraction, reasoning operations, concept analysis operations, or other analytical operations. That is, while the above mechanisms are focused on the way in which the matrix is represented to achieve greater efficiency in processing the matrix operation by reorganizing the non-zero values of the matrix to reduce cache misses and to utilized different compressed formats to represent the matrix for different iterations of the matrix operation, the illustrative embodiments set forth hereafter further improve the overall performance of the matrix operation by providing mechanisms to facilitate acceleration of the end-to-end process of concept analysis by utilizing one or more accelerator devices. Mechanisms are provided for accelerating the core computations of a matrix operation using massive data parallelism with a large number of parallel threads being executed, each thread performing operations on a portion of the large sparse matrix. Due to memory limits of the accelerator devices, batched execution is utilized that enables operations to be performed on batches of data, e.g., input vectors, corresponding to the fixed memory limits of the accelerator devices. The vector data structures are initialized in the memory of the accelerator devices, rather than at a host system, so as to reduce the amount of data transfer required. Results of operations within the accelerator devices are merged using a single function to thereby eliminate the need to store results to main memory of the host system. Thus, the matrix operation can be completely performed within the accelerator device without having to access host system resources.

In operation, the host system provides the accelerator device a set of concepts extracted from an information source, e.g., a document, an input natural language question, or any other source of concepts. In one illustrative embodiment, the information source is an input document having one or more embedded concepts and the concept analysis operation seeks to identify concepts related to those embedded in the input document to thereby associate a vector of related concepts with the input document. This resultant vector may be used to identify other documents having related concepts so as to provide a relative ranking of one document to another. In some illustrative embodiments, the information source may comprise a user profile, either alone or in combination with a document, search query, natural language question, or other request for content by the user, which is then used to provide the input set of concepts upon which the concept analysis operation is performed. For example, this may be used to perform a personalized PageRank operation in which the request for content specifies the content the user wishes to access and the user profile specifies the personal preferences of the user which can be used to modify the ranking of the resultant content returned to the user. In some illustrative embodiments, the user profile may be used as a way to modify the ranking of documents used to provide answers to a natural language question in a Question and Answer system. In short, any concept analysis operation that involves identifying related concepts based on a network/graph of a corpus of information that specifies related concepts may make use of the mechanisms of the illustrative embodiments.

With the mechanisms of the illustrative embodiments, the host system performs some initial processing of the information source to identify these concepts, with such processing being generally known in the art and hence, a more detailed description is not provided herein. For example, in a natural language processing system, search engine, or Question and Answer (QA) system context, the concepts may be extracted from a natural language question input to the QA system, or from an electronic document or search query, using natural language processing, search query parsing, or other textual analysis techniques. The resulting set of concepts are input to the accelerator device (hereafter referred to simply as the "accelerator"), which may be provided as a special purpose processor, a service processor, or the like. In one illustrative embodiment, the accelerator is a graphics processing unit (GPU) that is integrated in, or coupled to, the host system and whose main function is processing for rendering graphics, but which is repurposed dynamically to perform the concept analysis operations of the illustrative embodiments. The GPU may be provided with a different GPU kernel, in addition to the standard GPU kernel for graphics rendering, for performing concept analysis operations in accordance with the illustrative embodiments and which may be dynamically switched when needed and instructed by way of submitting jobs to the GPU from the host system, an instruction sent from the host system to the GPU, setting a predefined bit in a communication from the host system to the GPU, or any other mechanism that may be implemented for switching the operational mode of the GPU.

In addition to the concepts extracted from the information source, the host system provides the accelerator with a representation of a large sparse matrix for use in performing concept analysis operations. The large sparse matrix itself represents the network/graph of concepts and their relationships as already identified through processing of a corpus of information. For example, in a QA system environment, such as may be provided by the IBM Watson™ QA system, for example, a corpus of documents may be provided, e.g., Wikipedia™ web pages identifying various concepts and having links between concepts which are identifiable, to the QA system for use in answering questions submitted to the QA system. In a healthcare application, such a QA system may ingest a corpus of documents including medical journals, medical trial documents, medical resources including texts directed to describing drugs and procedures, medical dictionaries, patient records, or any other documents deemed pertinent to the medical domain. In other domains, similar collections of electronic documents may be provided as a corpus for ingestion by a QA system. The corpus may be processed using known or later developed ingestion processes, which may include natural language processing, feature extraction, and the like, to identify concepts specified in the corpus and the relationships between the concepts, as well as the strengths of these relationships, as specified in the corpus. The result is a network or graph of concepts with nodes representing the concepts and edges representing relationships between the concepts with the edges having weights representing the strength of the relationship between the connected concepts.

In a search engine context, the corpus of information may be a large set of web pages of various domains, such as the Internet. Thus, the network/graph may comprise many thousands of nodes and edges between nodes representing the concepts, their relationships, and the strengths of these relationships, as discussed above.

The network/graph may be represented as a large sparse matrix as discussed above. In accordance with the IBM mechanisms mentioned above and described in commonly assigned and co-pending U.S. patent application Ser. Nos. 14/611,297 and 14/635,007, the large sparse matrix may be re-organized using clustering and the resulting re-organized matrix may be represented using a plurality of compressed representations which may be used in a hybrid approach to performing matrix operations within the accelerator. In one illustrative embodiment, the re-organizing of the matrix may be performed by the host system along with the generation of the plurality of compressed format representations of the re-organized matrix. The resulting compressed format representations of the re-organized matrix may then be provided to the accelerator for use with its internal concept analysis operations which involve the use of matrix operations, such as matrix vector multiplication operations. The accelerator may comprise internal logic which implements the hybrid approach to performing matrix operations described in U.S. patent application Ser. No. 14/635,007 when performing iterations of the concept analysis operations.

It should be appreciated that the processing of the large sparse matrix to generate the re-organized matrix and compressed format representations of the re-organized matrix may be performed very infrequently. That is, as long as the large sparse matrix does not change significantly, there is no need to re-compute the re-organized matrix and compressed format representations. However, when the matrix changes significantly, such as due to updates to the corpus, a re-computation of the matrix may be initiated and an updated re-organized matrix and compressed format representations may be generated. This may be done on a periodic basis, in response to a system administrator or other authorized user request, or in response to occurrence of a defined event, e.g., an update to the corpus. Thus, while computational resources of the host system may be engaged for generating the re-organized matrix and corresponding compressed format representations infrequently, for the majority of the operations of the accelerator, the host system resources are not utilized other than to extract concepts from the information source and provide them as input to the accelerator.

Upon receiving the extracted concepts from the information source, as provided by the host system, the accelerator operates on the extracted concepts to generate one or more vectors for use with the concept analysis operations. The one or more vectors are provided to concept analysis operation logic which performs concept analysis operations using the vector(s) generated by the accelerator and the compressed format matrix representations provided as input to the accelerator by the host system. The result of the concept analysis operation is then normalized to a normal distribution and provided to post-processing logic of the accelerator which calculates rankings, i.e. strengths of relationships, of the concept relationships in the matrix with the concepts specified in the vector(s). The result is an output vector that comprises non-zero vector elements where concepts of the vector(s) intersect with non-zero entries in the matrix. The values of the output vector elements indicate the strength of relationships between the concepts in the vector(s) and the concepts in the matrix.

Thus, the mechanisms of the illustrative embodiments provide for the accelerator to perform concept analysis operations, external to the host system, based on the extracted concepts and matrix representation provided by the host system. The accelerator does not require that the results of the concept analysis operation be stored in main memory or external storage before calculating the final result and instead provides a single function that outputs the final result directly without intermediate storage to main memory or external storage. This minimizes data exchange between the host system and the accelerator and between the accelerator and main memory or external storage. As a result, the speed by which such concept analysis operations are performed is dramatically increased.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
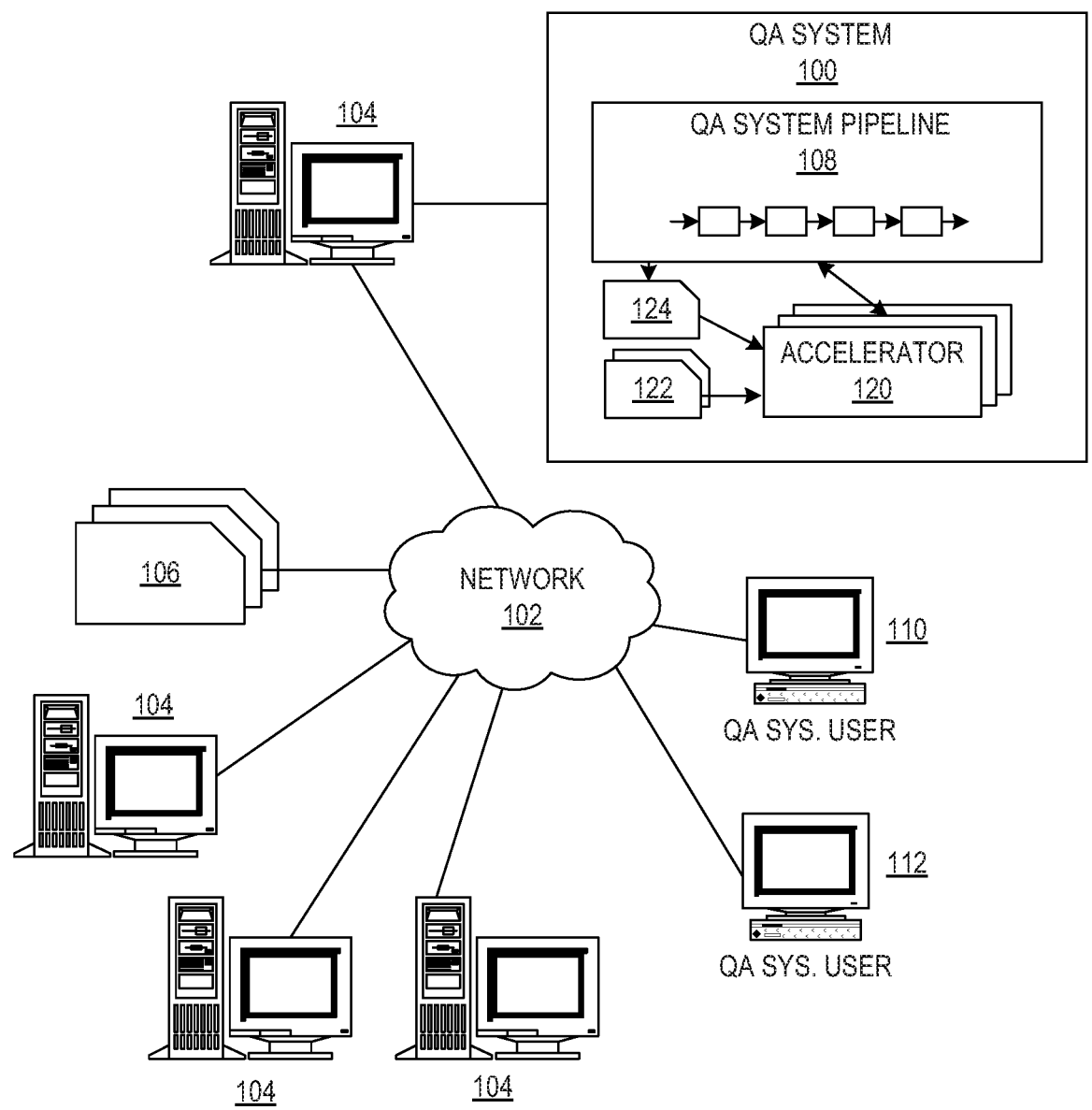
FIG. 1 depicts a schematic diagram of one illustrative embodiment of a question/answer creation (QA) system in a computer network.
Figure 2:
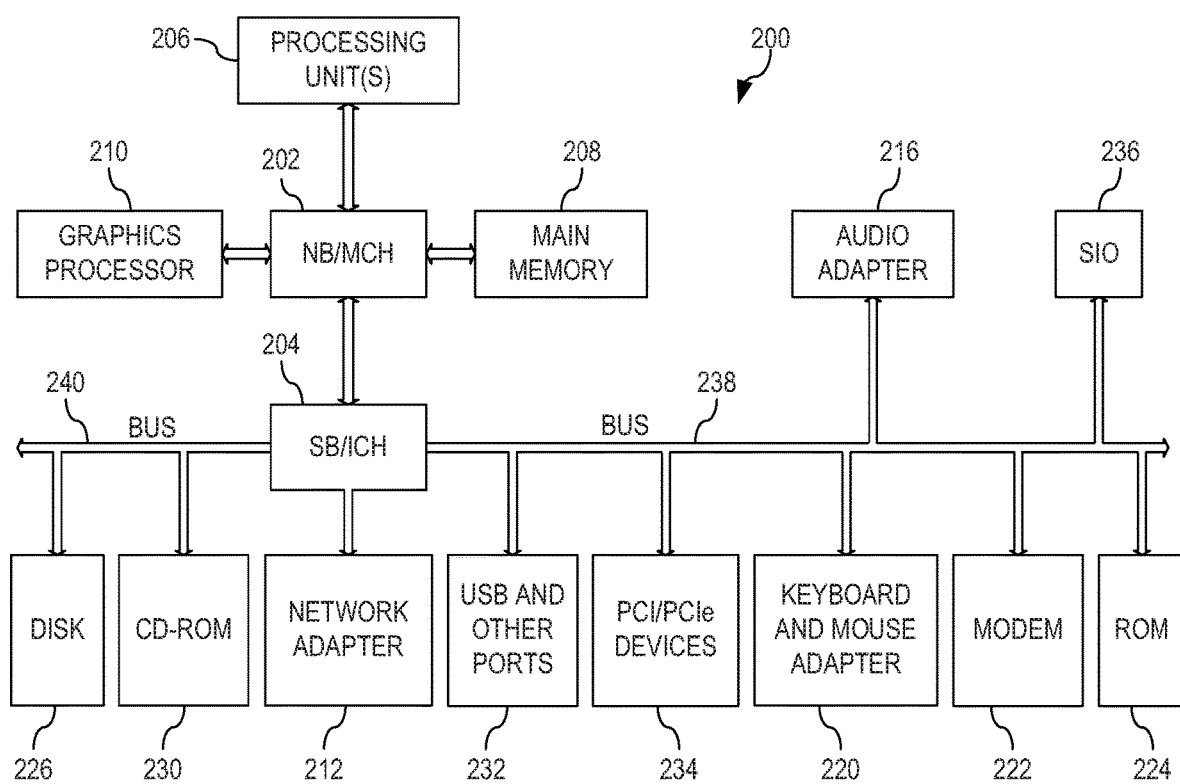
FIG. 2 is a block diagram of an example data processing system in which aspects of the illustrative embodiments are implemented.
Figure 3:
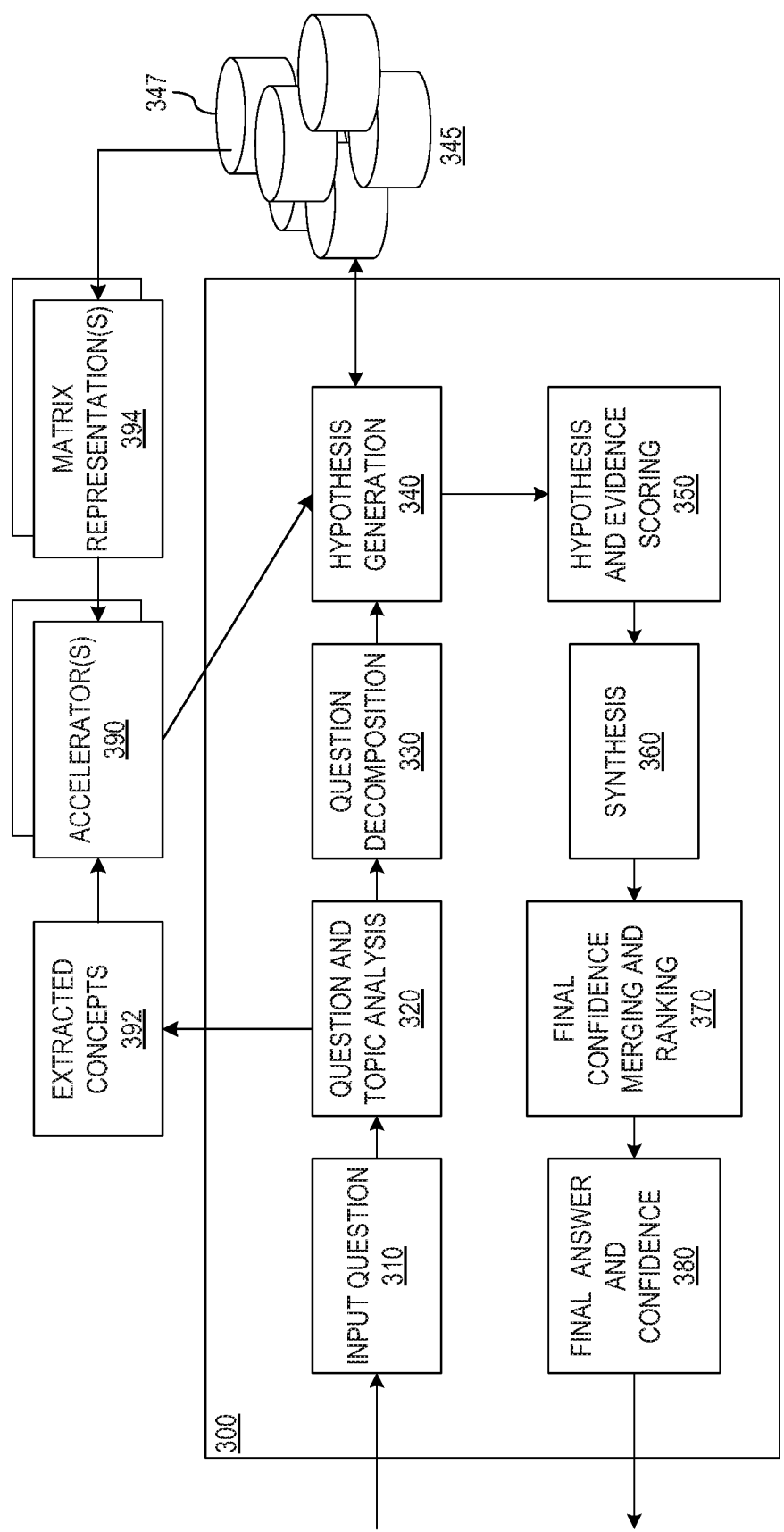
FIG. 3 illustrates a QA system pipeline for processing an input question in accordance with one illustrative embodiment.

The illustrative embodiments may be utilized in many different types of data processing environments including search engines, QA systems, natural language processing systems, and the like. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments may be integrated in, augment, and extend the functionality of these QA mechanisms with regard to performing concept analysis operations, which may be used with regard to identifying portions of a corpus where concepts related to concepts specified in an input question are found or with regard to identify evidence passages within the corpus when calculating confidence values associated with candidate answers to an input question, for example. In addition, the ranking of the evidence passages may be modified based on the concept analysis operations performed using the mechanisms of the illustrative embodiments by taking into account personal preferences of a user as specified by a user profile that may be input with the input question and which identifies concepts of interest to the user, thereby augmenting the input concepts used as a basis for identifying the related concepts.

Since the mechanisms of the illustrative embodiments will be described with regard to their implementation in a QA system, it is important to first have an understanding of how question and answer processing in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, including identified concepts in the input question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of reasoning algorithms (see, for example, McCord et al., "Deep Parsing in Watson," IBM J. Res. & Dev., vol. 56, no. 3/4, May/July 2012 for more information on deep analysis in IBM Watson™). There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. In accordance with the mechanisms of the illustrative embodiments, these intensive analysis mechanisms may utilize a large sparse matrix that represents the concepts and their relationships within the documents of the corpus as a means by which to identify concepts related to concepts specified in an input question, user profile (such as in a personalized ranking process), document being assessed for inclusion into the corpus, or any other concept analysis based operation.

As noted above, the concept analysis operation generally uses a large sparse matrix representing the network/graph of concepts and their relationships obtained from a knowledge source. The "knowledge source" is any electronic system or data structure that acts as a source of information and knowledge regarding known concepts and their relationships. This "knowledge source" may be a corpus of documents provided in a natural language format or predefined structured format, portions of text from various text sources such as postings to web sites, electronic mail messages, or any other source of textual content, web pages, or the like. In some cases, these "knowledge sources" may comprise databases of information provided in a structured format. Any source of information and knowledge that provides information upon which a network/graph of concepts and the relationships may be generated is intended to be within the spirit and scope of the term "knowledge source."

An "information source" as the term is used herein refers to the source of concepts for which relationship information is sought and whose concepts are the source for generating at least one vector to be used in a matrix operation. The "information source" may be an input document or set of input documents having natural language or structured text, an input natural language question, phrase, search query, user profile, and/or the like. In one illustrative embodiment, the "information source" is an input question to a QA system. In another illustrative embodiment, the "information source" is a document to be added to a corpus of information upon which the QA system operates. In other illustrative embodiments, the "information source" is any other source of textual input, such as a search query. Regardless of the particular implementation, the "information source" provides the text from which one or more concepts may be extracted for use in generating at least one vector to be used in performing a matrix operation as part of a concept analysis operation executed within an accelerator.

In general, concept analysis operations involve two main stages: indexing and related concept identification. With regard to the indexing stage, for example, assume that a knowledge source is an online encyclopedia comprising a large number of web pages, e.g., Wikipedia. From this knowledge source, a list of concepts N is extracted and a sparse relationship matrix N*N is computed where an entry (row i, column j) in the matrix is non-zero, e.g., "1", if concept i is related to concept j. For example, the concept "information theory" is a branch of "electrical engineering" such that in the network/graph an edge would connect "information theory" to "electrical engineering" and correspondingly, a entry in (i, j) corresponding to "information theory" and "electrical engineering" is set to 1. Performing this process for each concept in the knowledge source results in an indexed knowledge source represented by an N*N matrix in which non-zero entries represent relationships between concepts. The values in the entries may be set to values indicative of the strengths of the relationships between the concepts, with these strengths being calculated in many different ways based on various criteria.

During the related concept identification stage, for each information source, concept analysis extracts a set of M concepts. Using the knowledge source relationship matrix generated in the indexing stage, related concepts for each of the input concepts M are computed. This is typically done using a matrix vector multiplication operation, as discussed hereafter, or other sparse matrix (N*N)—dense matrix (N*M) multiplication operation (where the "dense matrix" is a set of vectors in matrix form and each vector may be processed separately to generate partial products which can later be combined). In some embodiments, this information source may comprise a personal profile of a user which indicates concept preferences for the user such that a personalized ranking process is performed as part of this related concept identification stage, i.e. concepts of interest to the user are identified by way of the concept analysis operation involving the matrix vector multiplication operation. This concept analysis may involve multiple iterations of these multiplication operations with the resultant matrix being post-processed to generate an N-element vector that represents how concepts from the information source relate to all other concepts in the knowledge source.

It should be appreciated that the value of M can vary significantly, e.g., from tens to thousands of concepts. The size of the intermediate data, i.e. the result of the matrix vector multiplications, depends on the value of M. To limit the intermediate data size, as discussed hereafter, the illustrative embodiments utilize batches, e.g., batches of size 32 (32 input vectors) in some embodiments, but may be of different batch sizes depending on the desired implementation.

The mechanisms of the illustrative embodiments accelerate the process of identifying related concepts, such as in the related concept identification stage of a concept analysis operation, by performing concept analysis operations using one or more accelerators, as described hereafter. The related concepts output vector generated by the one or more accelerators may be used to generate the candidate answers and rank these candidate answers in a QA system, or in other implementations, such as a search engine, rank the search results returned to a user's search query, for example. In some illustrative embodiments, this process may be utilized to provide a personalized ranking operation as mentioned above, in which concepts of interest to a particular user as specified by a user's profile (which may be provided as part of the information source) are identified. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receives inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the QA system 100 utilizes one or more accelerators 120 which accelerate concept analysis operations performed by the QA system 100. The one or more accelerators 120 preferably are provided such that they operate in conjunction with, and in parallel with, the operations performed by the QA system's pipeline. The accelerators 120 comprise processors and memory external to the primary QA system 100 processors and which operate as special purpose processors or service processors for the prior QA system 100 processors. In some illustrative embodiments the accelerators 120 are graphics processing units (GPUs) that are configured with a special purpose kernel for performing concept analysis operations on behalf of the QA system 100. As such, the GPUs may be dynamically switched between graphics processing and concept analysis operations by switching kernels in response to the QA system 100 submitting concept analysis operation tasks to the GPUs and thus, switching modes of operation. This switch may be facilitated by an instruction from the QA system 100, the setting of a bit that is checked by the GPU, or any other mechanism that may be used for switching the mode of operation of a GPU from graphics processing to another mode of operation.

In operation in a concept analysis mode of operation, the one or more accelerators 120 each receive one or more representations of a matrix 122 representing the known concepts and relationships between concepts previously extracted from a corpus through a corpus ingestion operation by the QA system 100. This process of generating a network/graph of concepts and relationships between concepts from natural language content is generally known in the art and thus, a more detailed description is not provided herein. Moreover, the network/graph is then represented as a matrix in a manner generally known in the art. Given the matrix, mechanisms are utilized to re-organize the matrix to concentrate the non-zero values of the matrix along the diagonal of the matrix. This process may utilize well known matrix re-organizing algorithms, such as the Cuthill-McKee algorithm, to perform such re-organization. In some illustrative embodiments, this matrix re-organization may be performed by implementing the matrix processing mechanisms described in co-pending and commonly assigned U.S. patent application Ser. No. 14/611,297, which utilize clustering to concentrate the non-zero values into clusters and organize the clusters along the diagonal of the matrix.

The matrix representation provided to the accelerators 120 may be previously generated and stored by the QA system 100 such that it is not re-calculated each time an input question is processed by the QA system 100. The matrix representation 122 is only re-calculated when there are changes to the corpus upon which the QA system 100 operates, in response to an authorized user's request, at periodic intervals, or upon occurrence of another designated event. The accelerators 120 may receive multiple representations of the matrix that are optimized for different sparsities (or densities) of the vector upon which the matrix operations are performed within the accelerators 120. For example, as described in commonly assigned and co-pending U.S. patent application Ser. No. 14/635,007, a CSR and CSC representation of the matrix may be provided with different iterations of the matrix operation performed within the accelerators using different ones of these representations based on the sparsity (or density) of the vector with which the matrix is being multiplied as part of a matrix vector multiplication operation. As iterations are executed, the vector's density may increase causing a need to switch from one representation to another to maximize efficiency of the operation.

The accelerators 120 also receive, from the QA system 100, a listing of concepts 124 extracted from the natural language input question, or other information source such as a document for inclusion in the corpus, a user profile as part of a personalized ranking operation, or the like, that is input to the QA system 100. The listing of concepts 124 are input to the accelerator 120 which operates on the listing of concepts to construct an input vector of extracted concepts for use in performing the concept analysis operation. In some illustrative embodiments, this concept analysis operation involves multiple iterations of a matrix vector multiplication in which initially, the input vector generated by the accelerator is multiplied by a representation of the matrix, e.g., the CSC representation, and the resulting vector output is used as the input vector for a next iteration. Based on the sparsity (or density) of the vector being multiplied with the matrix, the representation of the matrix may be selected so as to maximize efficiency of the operation, e.g., switching from using the CSC representation during an initial set of iterations to using the CSR representation during a latter subsequent set of iterations. Iterations continue until it is determined that the output vector has converged, i.e. changes to the output vector are below a specified threshold amount of change. Once converged, the resulting output vector represents the set of concepts related to the concepts extracted from the input question as well as the strength of the relationships (represented by the values in the vector elements of the output vector).

Thus, the work for generating an output vector of related concepts to the extracted concepts from an input question, or other information source, is offloaded to the accelerators 120 which operate in parallel to the host QA system 100. The host QA system 100 need only extract the concepts from the input question or other information source (assumed to be an input question for purposes of illustration), which is an operation that the QA system 100 performs already, and provide those concepts to the accelerators 120. The host QA system 100 infrequently generates one or more concept matrix representations as part of an ingestion process or other pre-processor processing process, with the frequency being relatively seldom due to infrequent changes to the corpus requiring updates of the concept matrix representations. Thus, the host QA system 100 is offloaded such that the accelerators 120 accelerate the process of generating the output vector of related concepts.

Because the accelerators 120 have limited memory size, the processing of concept analysis operations may be performed in a batched manner, with batches of input vectors representing one or more of the extracted concepts from the input question, user profile, or other information source, such that the accelerators utilize various threads for executing the concept analysis operation on batches representing portions of the input vector. Each batch may have a size (number of input vectors) set based on the size of the memory of the accelerator 120, for example. In one illustrative embodiment, the accelerator 120 is a GPU having a memory size capable of handling a batch size of 32 input vectors. In one illustrative embodiment, each input vector has one non-zero entry corresponding to an extracted concept from the information source. In other illustrative embodiments, each input vector in the batch may have one or more non-zero entries. The benefit of utilizing a single non-zero entry in the input vector is that it greatly simplifies the matrix-vector multiplication operation performed with regard to that vector such that it is simply a column or row lookup of the non-zero entries in the corresponding column/row in the matrix.

The results of the execution of the batches may be combined by the accelerator 120 internally to generate the resulting output vector of related concepts. Combining of partial products of a matrix-vector multiplication is generally known in the art and thus, need not be explained in detail further. However, it is important to note that the accelerator 120 does not store any intermediate results to the host QA system 100 memory or an external storage system but instead maintains the data internal to the accelerator 120 until the output vector of related concepts is output back to the QA system 100 for use by the QA system pipeline.

It should be appreciated that in some illustrative embodiments, a plurality of accelerators 120 may be utilized with each accelerator operating on a portion of the concept matrix representation 122 and/or listing of concepts 124. In such an embodiment, results from the various accelerators 120 may be combined by a combination stage of processing in one of the accelerators 120 (master accelerator), an external mechanisms to the accelerators (not shown), or in the host QA system 100.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP). The graphics processor 210 may be a GPU which may be used as an accelerator in the context of the present description, for example.

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, the QA system pipeline 300 may offload processing of the extracted concepts 392, which are part of the extracted features generated as part of stage 320, to one or more accelerators 390. The one or more accelerators 390 also receive corpus matrix representations 394 from the host QA system. These corpus matrix representations 394 are representations of the concepts and relationships between concepts previously generated by the QA system as part of a corpus ingestion operation. The corpus matrix representations 394, in one illustrative embodiment, comprise a CSC and a CSR representation. While multiple representations are utilized in the illustrative embodiments, it should be appreciated that the optimizations of using different representations for different densities of vectors as described in co-pending U.S. patent application Ser. No. 14/635,007 is not required and a single concept matrix representation may be utilized instead.

The accelerators 390 generate input vectors based on the received extracted concepts 392 from the input question 310 and perform concept analysis operations on the one or more corpus matrix representations 394 with the input vector. The accelerators 390 output the output vector of related concepts and strengths of relationships to the hypothesis generation stage 340 which utilizes the output vector to generate candidate answers to the input question 310. For example, the output vector specifies what the related concepts are to the concepts in the input question and/or user profile (if a personalize ranking operation is being performed) and thus, similar vectors associated with documents within the corpus may be analyzed to identify if they have non-zero values for the same concepts as the output vector for the current information source. If so, these documents may be ranked according to the non-zero values such that the higher valued (and stronger related) documents for the related concepts in the output vector for the information source are ranked higher when generating candidate answers.

It should be noted that while the above illustrative embodiments are described with regard to the use of the concept analysis operations, with acceleration provided by the accelerators of the illustrative embodiments, to identify concepts in the matrix (network/graph of the corpus) that are related to concepts extracted from an input question, the present invention is not limited to such. Rather, any operation where concept analysis and identification of related concepts using matrix operations may implement the mechanisms of the illustrative embodiments without departing from the spirit and scope of the illustrative embodiments. For example, rather than the input vector representing concepts extracted from an input question submitted to the QA system, the extracted concepts and resulting input vector may be obtained from other documents, web pages, portions of electronic natural language content, or the like. As one example, when ingesting or adding documents to a corpus, the mechanisms of the illustrative embodiments may be used to analyze and extract concepts from these documents, identify the related concepts already present in the matrix and expand the matrix and network/graph to include the addition of the new documents to the corpus, e.g., by adding nodes and edges, modifying edge weights, or the like. Moreover, during the ingestion process, this identification of a vector of related concepts may be performed with regard to each document, web page, portion of natural language content, or the like, so as to associate a vector of related concepts with that portion of the knowledge source. The vectors associated with the portions of the knowledge source may then be used to quickly identify the concepts with which those portions of the knowledge source correspond for purposes of selecting those portions for handling search queries, input questions, or other requests for information, such as personalize ranking operations, by identifying vectors having non-zero values corresponding to the concepts specified in the search query, input question, or requests. The vectors may be used to modifying the ranking of these portions of the knowledge source, or answers/results returned based of these portions of the knowledge source, according to the strengths of the relations with the related concepts specified in the associated vectors. Of course additional processing of the portions of the knowledge source may be performed once the portions are identified as being related to concepts related to those extracted from the information source, e.g., further natural language processing to evaluate the way in which the concepts are addressed within the portion of the knowledge source, etc.

As mentioned above, the accelerators 390 accelerate the performance of the concept analysis operation by offloading the host QA system and executing these concept analysis operations in parallel with other operations being performed by the host QA system. It should be appreciated that in offloading the host QA system, the accelerators 390 minimize data communications between the host QA system and the accelerators 390. To further illustrate the benefits and operational differences between the user of accelerators in accordance with the mechanisms of the illustrative embodiments, and a host system based concept analysis operation, reference is now made to FIGS. 4 and 5.

Figure 4:
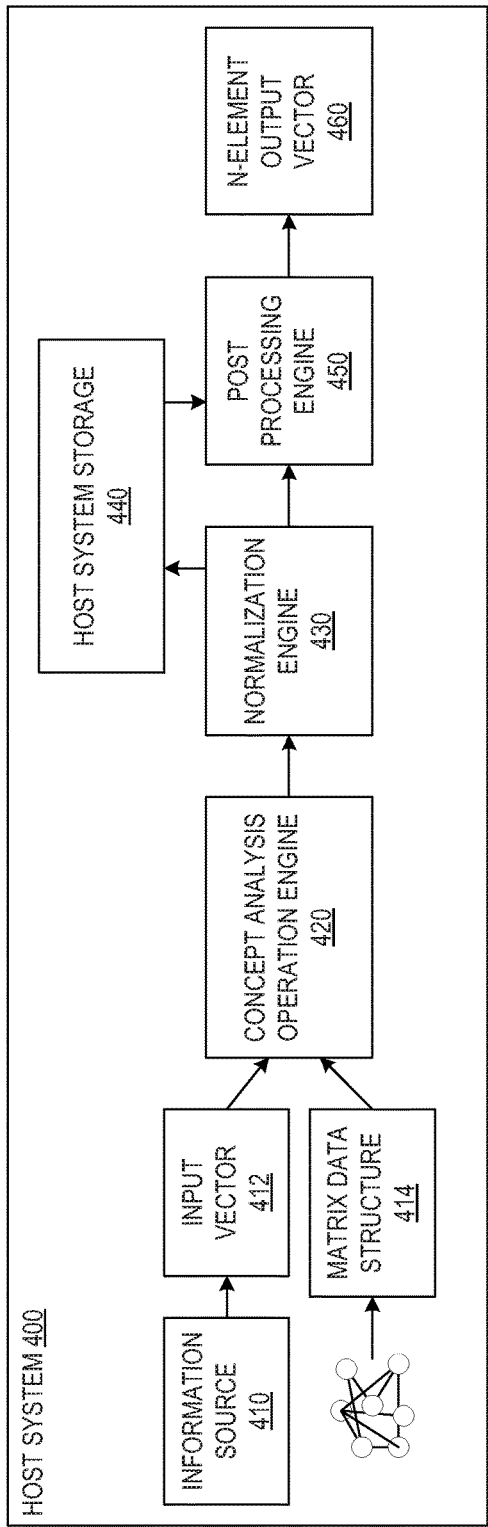
FIG. 4 is an example diagram illustrating one approach to performing concept analysis operations using a host system and host system storage.

FIG. 4 is an example diagram illustrating one approach to performing concept analysis operations using a host system and host system storage. As shown in FIG. 4, with a host based system for performing concept analysis operations, the host system performs all of the operations for performing the concept analysis operations and must store the intermediate results to main memory or a host system storage before performing post processing to generate the output vector. That is, as shown in FIG. 4, the host system 400 performs the initial concept extraction from the information source 410 (e.g., input question, document, or the like) and generates an initial input vector 412 that is provided as input to a concept analysis operation engine 420. In addition, the host system 400 either generates of retrieves the matrix data structure 414 for the corpus and inputs it to the concept analysis operation engine 420 as well. The concept analysis operation engine 420 comprises logic that operates on the input vector 412 and matrix data structure 414 to perform concept analysis operations involving iterations of matrix vector multiplication operations to identify concepts in the matrix data structure 414 that are related to the concepts specified in the input vector 412.

It should be appreciated that the input vector 412 may comprise any number of identified concepts and in general can range from 20 to over 3000 identified concepts. In some illustrative embodiments, the input vector 412 may be one of a plurality of input vectors 412 that together comprise an N*M input matrix. Each input vector 412 of the N*M input matrix may be handled separately during concept analysis operations as separate matrix vector multiplication operations, for example. The matrix data structure 414 preferably represents an N*N square sparse matrix which may comprise millions of concepts and their relationships (edges).

It has been observed that the concept analysis operation engine 420 may require multiple iterations to perform the concept analysis operation. In general, the concept analysis operation uses approximately 5 iterations of the matrix vector multiplication operations to achieve a converged result, although more or less iterations may be used under certain circumstances. With the matrix data structure 414 representing millions of concepts and their relationships, and the input vector(s) 412 representing potentially thousands of extracted concepts, the processing resources required to perform these multiple iterations is quite substantial.

The results generated by the concept analysis operation engine 420 comprise one or more output vectors specifying the concepts in the matrix that are related to the concepts in the input vector. Each non-zero value in the one or more output vectors indicates a related concept. The value itself is indicative of the strength of the relationship between the concepts. These values in the output vector(s) are normalized by the normalization engine 430 with the result being stored in the file system of the host system storage 440. The result is stored in the file system of the host system storage 440 because existing mechanisms are not designed for use with limited size memories and the intermediate data structures generated by the concept analysis operation can be very large due to the large scale input matrix and vector(s).

As part of a post processing, the post processing engine 450 retrieves the normalized output vector results stored in the host system storage 440 and performs a ranking operation on the output vector results. The ranking operation essentially ranks the concepts according to their strength values in the output vector such that the highest ranked concepts are ranked higher than the other concepts. The post processing engine 450 then outputs a final N-element output vector 460 representing a ranked listing of the concepts related to the concepts extracted from the information source. This N-element output vector 460 may be associated with the information source, such as in a metadata data structure associated with the information source, integrated into the data structure of the information source, stored in a separate data structure linked with the information source, or the like. For example, if the information source is a document that is being added to a corpus of documents, the N-element vector generated by the accelerator may be stored in association with this document for later use when searching the corpus for documents having certain related concepts.

It should be appreciated that in some illustrative embodiments, this concept analysis operation may be performed with regard to each portion of information in a corpus of information so that each portion may have an associated N-element vector (N being the number of concepts). This facilitates different operations for using the N-element vector to identify related portions of information and performing searching of the corpus. For example, calculations may be performed on N-element vectors of different portions of information, e.g., documents, in the corpus to determine which portions are highly similar to one another. For example, a calculation of the degree of similarity of the non-zero strength concepts in the N-element vectors of two documents may be evaluated to determine whether these documents are directed to describing similar concepts. A document regarding oncology patient treatment may have an N-element vector that has high strength values for oncology concepts while another document directed to a measles outbreak in California may not have high strength values for oncology concepts in its N-element vector and thus, by comparing the N-element vectors, one can determine whether these documents are similar (i.e. address similar concepts) or not. Likewise, a document directed to cancer research at a leading university may have an N-element vector with many of the oncology concepts having non-zero values corresponding to those of the oncology concepts of the oncology patient treatment document and thus, will be determined to be similar based on a comparison of the N-element vectors. Similarity in this manner can also be performed between the related concepts output vector for an input question, search query, user profile, and/or the like and portions of information in a corpus for purposes of answering the input question, returning search results, or performing personalized ranking operations, for example.

Figure 5:
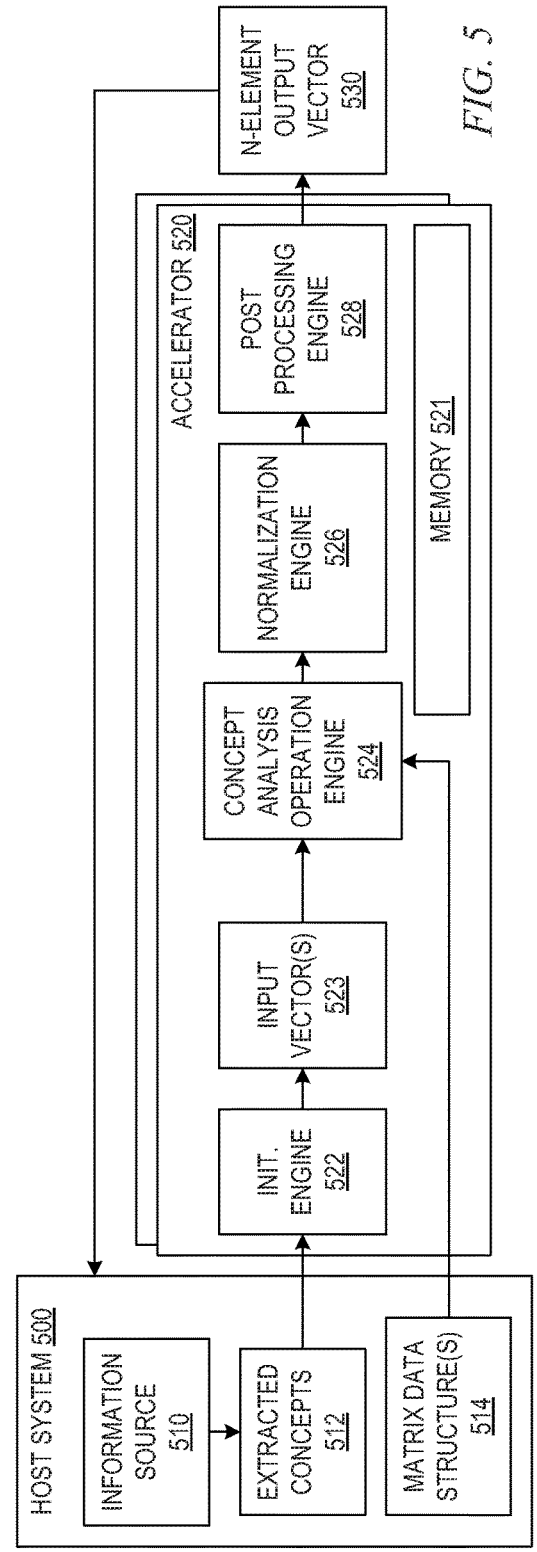
FIG. 5 is an example diagram illustrating concept analysis operations being performed using one or more accelerator devices in accordance with one illustrative embodiment.

FIG. 5 is an example diagram illustrating concept analysis operations being performed using one or more accelerator devices in accordance with one illustrative embodiment. As shown in FIG. 5, as opposed to the operation outlined in FIG. 4, the host system 500 does not generate the input vector(s) and does not perform the concept analysis operations, normalization operations, or post-processing operations. Moreover, there is no storage of intermediate results to a host system storage. To the contrary, these operations and the intermediate results are performed and maintained within the accelerator.

As shown in FIG. 5, the host system 500 is responsible for extracting a listing of concepts 512 from the information source 510 and providing the list of concepts 512 and one or more matrix representation data structures 514 to the accelerator 520. The accelerator 520 includes an initialization engine 522 which operates on the listing of concepts 512 to generate one or more input vectors 523, which again may be a set of input vectors 523 that together constitute and N*M matrix of concepts extracted from the information source 510. The generated input vector(s) 523 are provided to the concept analysis operation engine 524. The concept analysis operation engine 524 operates on the input vector(s) 523 and the matrix representation data structures 514 to perform iterations of a matrix vector multiplication operation that identifies concepts in the matrix that are related to concepts in the input vector(s) 523.

It should be appreciated that the operations performed by the initialization engine 522, the concept analysis operation engine 524, and the normalization engine 526 are performed on batches of data from the input vector(s) 523 and/or matrix representation data structures 514 with the batch size being determined by the memory limits of the accelerator 520 which comprises a memory 521 that is used to stored the data while it is being processed. Thus, each batch may be handled by a separate thread with the sum of all of the batches equaling the total size of the matrix and the input vectors. In one illustrative embodiment, the batch size is set to 32 vectors generated from the input vectors of extracted concepts from the information source. For example, the input vectors may specify tens to thousands of concepts extracted from the information source and these concepts may be broken down into individual vectors having one or a small subset of the extracted concepts that are handled by a thread of execution in the accelerator. Thus, multiple threads may be utilized, each thread handling processing of a different vector within a batch of vectors generated from the input vectors. Multiple batches may be executed in this manner with the results of processing each vector in each batch being combined with the results of the other vectors in the batch and the results of each of the batches being combined to generate the final result. For example, if the input vectors represent 1000 extracted concepts, a first batch may have the first 32 extracted concepts (one non-zero value in each vector of the batch), while a second batch may comprise concepts 33-65, a third batch may comprise concepts 66-98, etc. Hence, for large size matrices and input vectors, the operations of elements 522-526 are performed using massive data parallelism and potentially thousands of threads operating on batches of vectors generated based on the input vectors of the extracted concepts.

The results of the concept analysis operation are output by concept analysis operation engine 524 to the normalization engine 526 which normalizes the results and directly outputs the normalized results to the post processing engine 528. The post processing engine 528 compiles the normalized results and performs a ranking operation to rank the results and generate an N-element output vector 530 which is output to the host system 500. The ranking of the results may rank the results according to the strengths specified by the non-zero values in the output vectors generated for each of the batches so as to generate a single ranked N-element output vector 530.

It should be appreciated that in the above operation, the matrix representation data structures 514 need only be loaded into the accelerator once and may be used as a basis for all of the threads batch executions. Moreover, until the matrix representation data structures 514 need to be updated or modified due to changes in the matrix (and thus, the network/graph representing the corpus), the loaded matrix representation data structures 514 may be used for subsequent processing of other information sources 510. Hence, for the majority of operations performed by the accelerator, the only input required from the host system 500 is the listing of extracted concepts 512 from the information source 510. Moreover, the output from the accelerator 520 is an N-element vector. Thus, the data transfer between the host system 500 and the accelerator 520 is minimized. Moreover, because all of the operates are performed internal to the accelerator without having to utilize host system resources, and these operations are performed in parallel with operations being performed by the host system 500, the speed by which the concept analysis operations is performed is increased.

Figure 6:
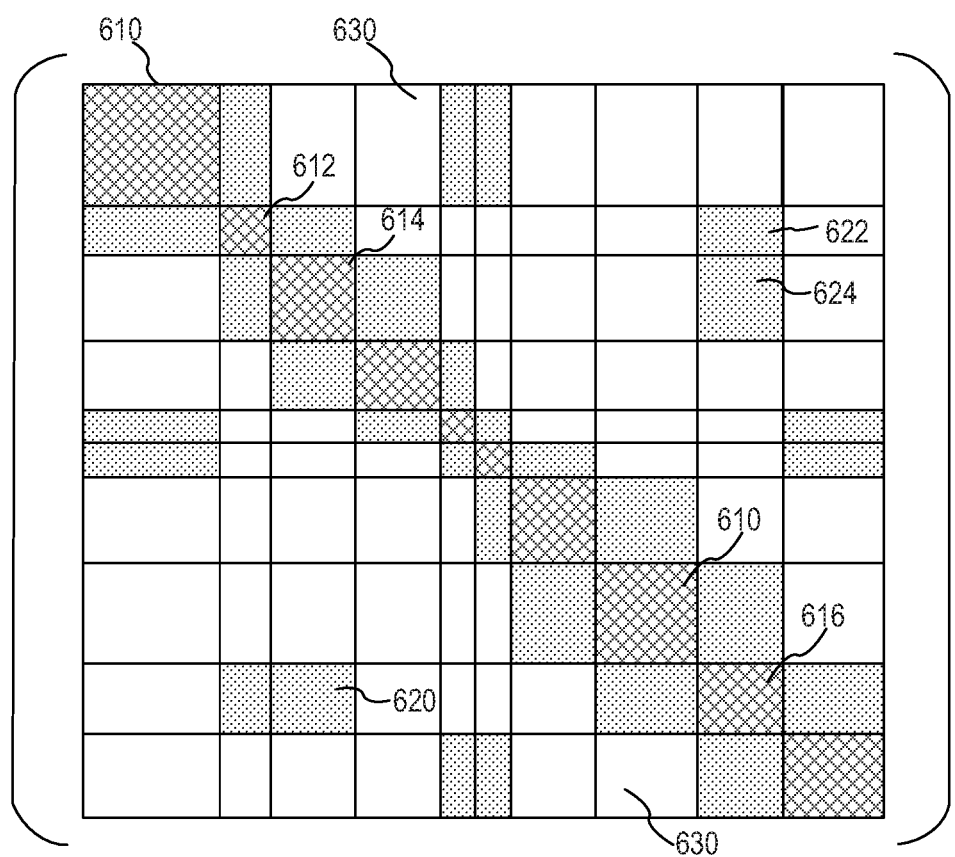
FIG. 6 is an example diagram illustrating an ordering of matrix entries obtained by using a clustering based matrix reordering operation in accordance with one illustrative embodiment.
Figure 7:
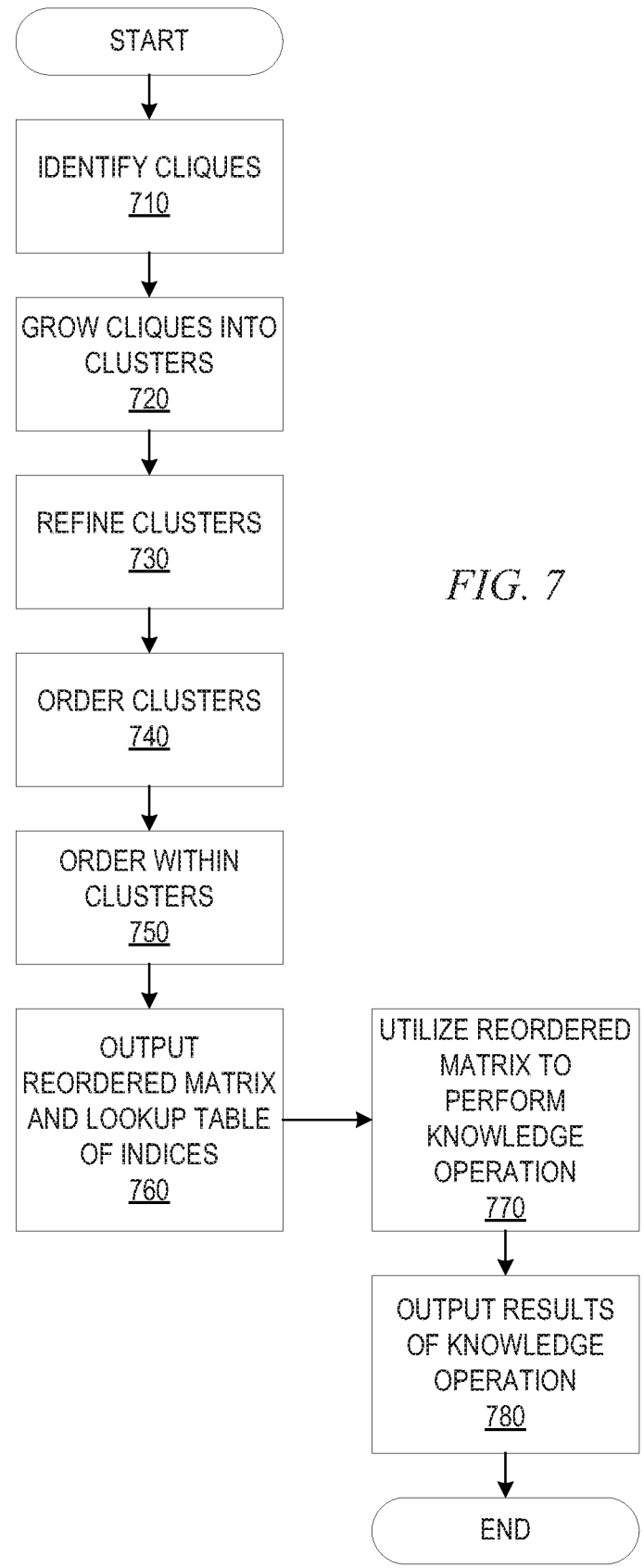
FIG. 7 is a flowchart outlining an example clustering based matrix reordering operation in accordance with one illustrative embodiment.

As mentioned above, one of the optimizations that may be performed to improve performance of the concept analysis operations is to re-organize the large sparse matrix so that non-zero entries are concentrated near one another. This minimizes cache misses due to speculative loading of portions of the matrix into memory. Similar performance improvement is made possible by using such re-ordering of the matrix prior to generating the matrix representations in the illustrative embodiments since portions of the matrix are loaded into the memory of the accelerator for each thread to operate on. The more non-zero entries present in the portion loaded into memory, the more efficient the operation. One way to perform such concentration of non-zero entries is to utilize clustering of non-zero entries as described in co-pending and commonly assigned U.S. patent application Ser. No. 14/611,297. FIGS. 6 and 7 illustrate this clustering based matrix reordering operation which may be used with the mechanisms of the illustrative embodiments to provide the matrix representation data structures 514 to the accelerator 520.

FIG. 6 is an example diagram illustrating an ordering of matrix entries obtained by using a clustering based matrix reordering operation in accordance with one illustrative embodiment. As shown in FIG. 6 the resulting reordered matrix generated as a result of the operations of the mechanisms of the illustrative embodiments has non-zero entries or elements concentrated into clusters 610 near the diagonal, e.g., clusters 612-616, and those non-zero entries that are far from the diagonal, e.g., clusters 622-624, are closely collocated into off-diagonal clusters 620. Each of the clusters 610, 620 (represented as shaded regions of the matrix in FIG. 6), has non-zero entries that are loosely tied to one another, meaning that the number of connections of the nodes corresponding to these entries or elements have to other nodes within the same cluster 610, 620 is greater than the number of connections the nodes have to nodes outside of the cluster 610, 620, e.g., movie stars have more connections to other movie stars than to general public and thus, movies stars would be a cluster. The non-shaded regions 630 of the matrix are permitted to include a small-number of non-zero entries or elements (referred to as "elements" hereafter).

The ordering of the matrix shown in FIG. 6 is achieved even for large scale matrices that have near-scale-free graph topologies. As shown in FIG. 6, there is no dominant chunk of non-zero elements that is generated as a result of the matrix reordering operations. Thus, the limitations on the improvement in cache efficiency and runtime execution encountered with the known reordering algorithms, such as the Cuthill-McKee and dissection algorithms, are not an issue for the matrix reordering mechanisms of the illustrative embodiments. To the contrary, the matrix reordering mechanisms achieve the ideal reordering sought by the Cuthill-McKee algorithm, for large scale near-scale-free graph topology matrices, with only some off diagonal clusters 620 being present but with these being concentrated into their own clusters 620.

The benefits of this organization of clusters 610, 620 of non-zero elements along the diagonal is that cache misses are reduced during the matrix operation. That is, the matrix multiplication operation typically looks for non-zero elements in the matrix when performing the matrix multiplication operation. Since these non-zero elements are concentrated into clusters 610, 620, when a cluster is loaded into the cache memory, more cache hits occur with less cache misses. This is especially true for the clusters 610 positioned along the diagonal of the reordered matrix where even when additional clusters are loaded into the cache memory, the clusters are closely located to one another. Even for those non-zero elements that are off the diagonal, the majority of these non-zero elements are clustered within off-diagonal clusters 620 such that when these clusters are loaded into cache memory of the accelerator 520, there are less cache misses when accessing the corresponding entries in the input/output vector. While some non-zero elements are not in the clusters 610, 620, i.e. located in the non-shaded areas 630 of the reordered matrix, the efficiency increase obtained through the clustering outweighs the relative few non-zero elements that are not located in clusters 610, 620.

The clustering methodology of the mechanisms of the illustrative embodiments concentrates the non-zero elements into closely tied clusters 610, 620 as opposed to the known Cuthill-McKee algorithm which is more concerned with graph distances, as represented by the various levels utilized in the Cuthill-McKee algorithm. Because Cuthill-McKee is more concerned with graph distances, it is possible to have large chunks of non-zero elements that do not improve cache efficiency as discussed above. Moreover, with dissection algorithms, the concern is to look for disconnected sets of data such that if the set of data is taken out of the matrix, the remaining data will be connected. Again, this can lead to large chunks of non-zero elements that do not improve cache efficiency as discussed above. Because the mechanisms of the illustrative embodiments utilize closely tied clusters 610, 620, the possibility of large chunks of non-zero elements is significantly reduced. Moreover, because the mechanisms of the illustrative embodiments organize the clusters 610, 620 so as to reduce cross cluster connections and cross cluster connection lengths, the clusters 610, 620 are organized in a compact configuration within the reordered matrix making for more efficient loading of the non-zero elements into cache memory and thereby reducing cache misses.

To illustrate the amount of efficiency increase that is achieved by implementation of the mechanisms of the illustrative embodiments, consider the following Table 1 which illustrates results of a sparse matrix to vector multiplication benchmark that is used to evaluate the number of cache misses on an Intel Nehalem processor with and without the matrix reordering mechanisms of the illustrative embodiments.

TABLE 1

Sparse Matrix to Vector Multiplication Benchmark

| | Without Reordering | With Reordering |
|---|---|---|
| INST_RETIRED.ANY | 527,852 Mil | 552,980 Mil |
| MEM_INST_RETIRED.LOADS | 145,950 Mil | 139,740 Mil |
| L2_LINES_IN.ANY | 10,326 Mil | 7,524 Mil |
| OFFCORE_RESPONSE_0.ANY_DATA.ANY_LLC_MISS | 4,158 Mil | 2,365 Mil |

Each row of the table represents a hardware counter. The first row is the total number of instructions. The second row is the number of memory load instructions. The third row is the number of L2 cache misses. The fourth row is the number of L3 cache misses, which are the most expensive and dominate runtime. It should be noted that the L3 cache misses are reduced by almost half through use of the reordering mechanisms of the illustrative embodiments. The measured runtime execution is also reduced by almost half by the reordering mechanisms of the illustrative embodiments, which is far superior than the 10% improvement achieved by the Cuthill-McKee or dissection algorithms.

Having illustrated the results obtained by the clustering based matrix reordering mechanisms of the illustrative embodiments, the following is a more detailed discussion of the mechanisms and operations performed as part of this clustering based matrix reordering. It should be appreciated that the following discussion is directed to one illustrative embodiment for implementing the clustering based matrix reordering and is not intended to be limiting but rather illustrative of one example methodology and mechanisms used to perform this reordering. Many modifications may be made to the illustrative embodiments as will become apparent to those of ordinary skill in the art in view of the present description, without departing from the spirit and scope of the present invention.

FIG. 7 is a flowchart outlining an example clustering based matrix reordering operation in accordance with one illustrative embodiment. The clustering based matrix reordering operation shown in FIG. 7 may be implemented in specially configured hardware configured to implement the operations described hereafter, software executed on hardware and configured to implement these operations, or any combination of specially configured hardware and software executed on hardware. In one illustrative embodiment, the operations outlined in FIG. 7 are performed in a host system as part of a corpus ingestion or pre-processing operation so as to reorganize the matrix representing the concepts in the corpus and their relationships to achieve the organization shown in FIG. 6. This re-organized matrix may then be used to generate one or more matrix representation data structures that are provided to the accelerators of the illustrative embodiments for accelerating concept analysis operations as previously discussed above.

To illustrate the operation of the illustrative embodiments in association with the description of the operations set forth in FIG. 7, an example in which a matrix M is comprised of indices or nodes corresponding to users of a social networking service will be utilized, where non-zero elements corresponding to the indices or nodes are indicative of a relationship between the users represented by the indices or nodes. It should be appreciated that this is only an example and the mechanisms of the illustrative embodiments may be utilized with any matrix operation performed on any large scale matrix having a near-scale-free graph topology. For example, instead of users of a social networking service, the matrix M may have nodes representing concepts found in a corpus of information and edges representing identified relationships between these concepts.

As shown in FIG. 7, the operation starts by analyzing an input matrix M to identify cliques within the matrix M (step 710). The input matrix M may be a set of collected data representing connections or relationships between particular information objects, concepts, entities, or the like, which are specified as indices of the matrix M. For example, in a social networking environment, the indices of the matrix M may represent users of the social networking services, their attributes, communications exchanged between the users, or the like. In a question answering environment or internet search environment, the indices of the matrix M may represent features (concepts) of documents in the corpus of information that is used as a basis for performing the question answering or internet search. Thus, the indices in the input matrix M represent any information, concepts, or entities that are suitable for the performance of a knowledge extraction, reasoning, or other analysis operations. The entries at the intersection of two indices stores a value indicative of the existence or non-existence of a relationship between the information, concepts, or entities represented by the indices that intersect.

A clique is defined as a set of row and column indices (or nodes) of the matrix such that their sub-matrix is composed of all non-zero entries. For example, if a first user represented in matrix M is connected to a second user and vice versa, the two users may constitute a clique. The clique may be identified by using a starting node or index and identifying other nodes or indices within the matrix M that are connected to the starting node or index and vice versa, i.e. the intersections of the indices identifies a non-zero value element in the matrix M. This process can be repeated for each of the nodes or indices that are connected to the starting node or index where some of the connected nodes or indices (hereafter referred to simply as "nodes") may be part of the clique while others are not. That is, for example, if John Smith is the starting node and has a "friend" connection to Pete Johnson, and Pete Johnson has a "friend" connection to John Smith, then John Smith and Pete Johnson may constitute a clique. If Pete Johnson did not have a connection to John Smith, then Pete Johnson may not be included in the clique, although, as discussed hereafter, he may be included in the subsequently generated cluster.

The process of generating cliques may be repeated for each node in the input matrix M such that multiple cliques are generated. A minimum size requirement may be specified in a configuration parameter that indicates a minimum number of nodes that must be present in the clique for the clique to be maintained for further use as a starting point for the other operations in FIG. 7, e.g., the clique must have at least 20 nodes, where smaller size cliques having less than 20 nodes are discarded.

Having generated the cliques as initial clusters of connected nodes of the matrix, a cluster growth operation is performed to grow clusters from each of the cliques (step 720). In growing the cliques into clusters, the nodes of the matrix that are not already part of a clique are assigned to a cluster. The assignment of nodes to clusters is based on the number of connections that the corresponding row/column has to nodes already within the cluster. That is, the node is added to a cluster to which it has the most connections, i.e. non-zero value elements associated with other nodes of the cluster. This may leave some nodes without a cluster if the node does not have any connections to the other nodes or relatively few connections to other nodes. As a node joins a cluster, the data structure representing the cluster is updated and the newly added node is used as a basis for adding additional nodes, e.g., if John Smith is added to a cluster of users that represents friends of Mary Monroe, then friends of John Smith may further be used as a basis for determining if any of these friends should be added to the cluster of friends of Mary Monroe.

In this way, the cluster grows from an initial clique to a larger size cluster. A maximum cluster size for clusters may be set in configuration parameters of the clustering-based matrix reordering mechanisms. The maximum cluster size may be set as a function of the memory hierarchy parameters, e.g., cache sizes, in the computing architecture in which the mechanisms of the cluster-based matrix reordering are to be implemented. For example, a cluster maximum size may be set to a size equal to a proportion of a particular cache size in the architecture, e.g., the X % of the L3 cache size, for example, or the size of the memory of the accelerators 520, as another example.

Once each of the non-zero elements of the matrix have been processed and corresponding nodes added to clusters in the manner described above, the clusters may be refined by allowing nodes to be reassigned to other clusters (step 730). For example, the nodes of each cluster may be analyzed to determine if they have more connections to nodes of other clusters than to nodes in their currently assigned cluster. If a node in cluster A has more connections (non-zero elements) to nodes in cluster B, then the node may be reassigned to cluster B. The reassignment may be permitted by the cluster-based matrix reordering mechanisms in response to a determination that the reassignment will result in reduction in the total number of cross-cluster connections (or edges) without violating cluster maximum size limitations. Thus, if cluster B is already at a maximum size, the reassignment may be denied. Moreover, if the reassignment does not reduce the total number of cross-cluster connections, the reassignment may be denied. This refining may be performed with regard to each node of each cluster generated in step 720.

Having refined the clustering of the nodes in step 730, the resulting clusters are ordered so as to minimize the total length of cross-cluster connections (or edges), i.e. minimize how far away the node entries are from the diagonal of the matrix (step 740). Moreover, as part of this operation, cross-cluster connections are concentrated in terms of their two end nodes distribution, i.e. length of connections between the two nodes of the connection is minimized. This operation may be implemented as a dynamic programming algorithm which optimizes a partial solution at a time and the partial solution is incremented one cluster by one cluster until all are ordered.

Although not required, and instead being an optional operation, nodes within the ordered clusters may themselves be ordered locally within the cluster (step 750). This local ordering of the clusters moves the non-zero entries closer to the diagonal within the cluster and moves nodes with cross-cluster connections closer to the boundaries of the cluster. That is, when ordering within a cluster, if node of the matrix in the cluster has connections (non-zero elements) to nodes of other clusters that are ordered before the cluster, then the node is located at an early location (towards a "front end") within this cluster such that its cross-cluster non-zeroes are closer to the diagonal of the reordered matrix. In the same manner, if a node has connections (non-zero elements) to other clusters that are ordered after this cluster, the node is located in a later location (towards a "back end") within the cluster. At the local level, such reordering within the clusters may be accomplished by performing the same operations as discussed above (steps 710-740) but on the local cluster, or other known algorithms may be used to reorder the non-zero elements, such as Cuthill-McKee or dissection. It should be noted that the known algorithms may be used on the individual clusters for intra-cluster reorganization because the cluster is a relatively smaller and more strongly connected sub-graph (not as sparsely populated) such that there is not a large difference in cache efficiency between reordering algorithms.

It should be appreciated that, either while this reordering process is being performed or after this reordering process is complete, vectors in a lookup table are updated to represent the new locations of the elements that have been moved. For example, the lookup table may comprise a first vector with locations of the indices of the original matrix M and a second vector having the new locations after the reordering is performed, with pointers from one vector entry to the other so as to allow mapping of the elements' original locations to their new locations in the reordered matrix. This lookup table and the reordered matrix may be output for use in performing matrix operations and ultimately, the knowledge extraction operations, reasoning operations, or other analytical operations (step 760).

During runtime operation, the output lookup table and reordered matrix may be used to generate matrix representations for use in performing matrix operations as part of a knowledge operation, i.e. knowledge extraction, reasoning, analysis, or the like, which in the case of the above accelerator 520, may be a concept analysis operation performed within the accelerator 520 (step 770). The results of this knowledge operation may then be output (step 780), e.g., the N-element vector may be output by the accelerator. Thus, the mechanisms of the illustrative embodiments specifically configured the computing devices upon which they are implemented for specifically performing this type of clustering-based matrix ordering operation, which is not performed by generic computing devices, and which improves the operation and functionality of the computing devices. Moreover, the mechanisms of the illustrative embodiments modify the functionality and performance of the computing devices upon which they are implemented by increasing the cache efficiency of the computing device during matrix operations.

It should be appreciated that steps 710-760 may be implemented prior to use of the reordered matrix and lookup table during runtime matrix operations. That is, these steps 710-760 may be used in a pre-processing of the matrix with the resulting reordered matrix and lookup table being output to the runtime system components for use in performing their runtime operations. In this way, the matrix need not be reordered each time a matrix operation is to be performed during runtime, which is represented as steps 770-780. Applying this to the accelerator 520 in FIG. 5, steps 710-760 may be performed by the host system 500 as a pre-processing operation while steps 770-780 are performed within the accelerator 520 based on the matrix representation input to the accelerator 520, this matrix representation being generated based on the re-ordered matrix.

As also noted above, the accelerators 520 may receive as input, one or more matrix representation data structures that represent the matrix in a compressed format. The compressed format concentrates on representing the non-zero values in the matrix while any entries in the matrix not represented in the compressed format are assumed to be zero entries in the matrix. There are various types of formats that may be utilized including the Yale sparse matrix format, CSR, CSC, and others. As recognized in the co-pending and commonly assigned U.S. patent application Ser. No. 14/635,007, efficient execution of concept analysis operations may be achieved by dynamically modifying the representation used to perform iterations of the matrix vector multiplication operations that make up the concept analysis operation in accordance with the sparsity (or density) of the multiplicand vector. Thus, in some illustrative embodiments, a single matrix representation may be utilized that implements a single compressed format, e.g., either Yale, CSR, CSC, or another known or later developed compressed format for matrix representation. In other illustrative embodiments a plurality of matrix representation data structures having different compressed formats may be provided to the accelerator 520 such that the accelerator dynamically selects a matrix representation data structure based on a determined sparsity (or density) of the multiplicand vector.

For example, it has been recognized that CSR formatted matrices are more suitable for parallel execution of matrix vector multiplication operations for dense vectors, i.e. vectors having more non-zero values than zero values. This is because CSR orders the non-zero values of the matrix row by row and allows non-zero values of a row to be grouped together with the value of the vector with which they are being multiplied. As a result, each multiplication of a row by a vector element can be distributed to a different worker, e.g., a different thread within the accelerator 520.

Figure 8A:
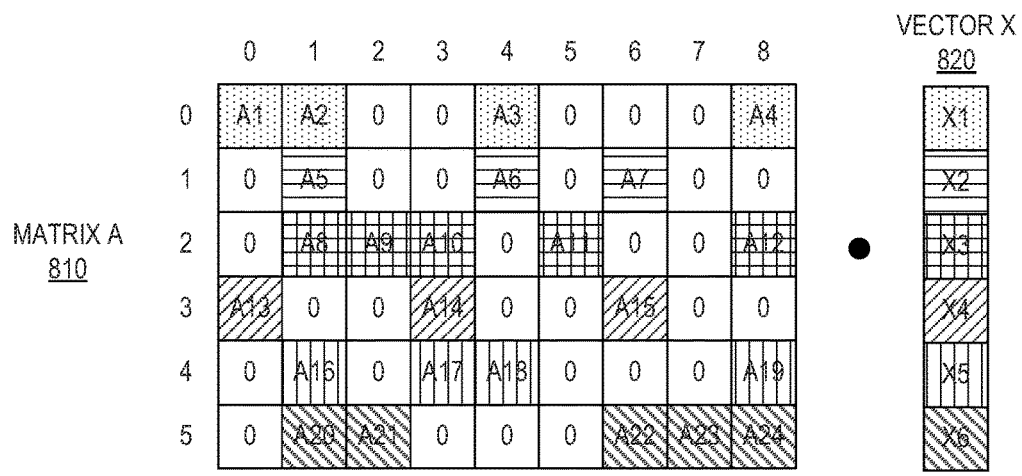
FIG. 8A illustrates a matrix vector multiplication operation performed using a Compact Sparse Row (CSR) formatted data structure of a matrix along with sample pseudo-code for performing the partial matrix vector multiplication operations.
Figure 8A:
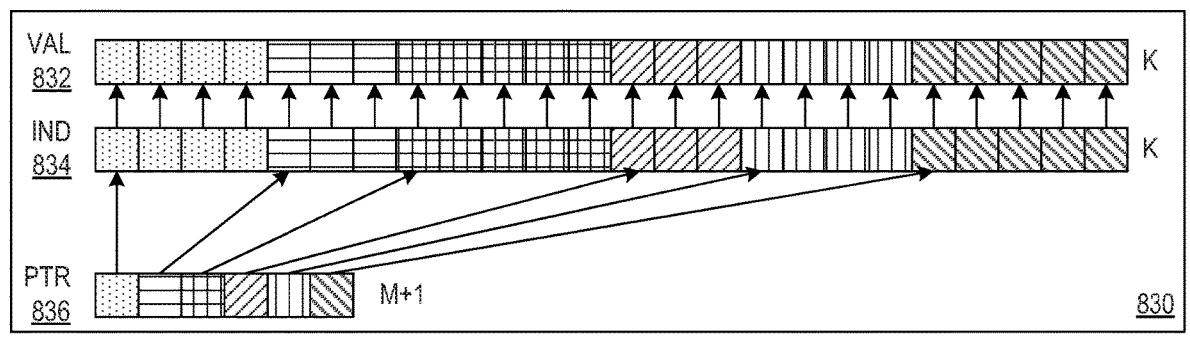

For example, FIG. 8A illustrates a matrix vector multiplication operation performed using a Compact Sparse Row (CSR) formatted data structure of a matrix along with sample pseudo-code for performing the partial matrix vector multiplication operations. As shown in FIG. 8A, the matrix A 810 is being multiplied by the vector X 820 such that the kernel of the matrix vector multiplication operation is $y(i)=y(i)+(A(i,j)*x(j))$ where again i is the row index, j is the column index, y is the partial result of the matrix vector multiplication operation, $A(i,j)$ is the entry at i, j in matrix A, and $x(j)$ is the value in the vector X corresponding to column index j.

As shown in FIG. 8A, the data structure representation 830 of the matrix A 810 comprises a value (val) array or vector 832, a column index (ind) array or vector 234, and a row pointer (ptr) array or vector 836. The val array 832 stores the values of the non-zero entries in the matrix A (left-to-right, then top-to-bottom). Thus, the non-zero values in row 0 of matrix A appear first (as depicted by the shading patterns), followed by the non-zero values in row 1, row 2, and so on. The ind array 834 stores the column indices of the corresponding values in the val array 832. The ptr array 836 stores the pointer to the where the row starts for the values in the ind array 834.

As shown in the pseudo-code for performing the partial matrix vector multiplication operations, for each row i, and for each pointer value k in the ptr array 836, a partial matrix vector multiplication operation result is generated as $y[i]=y[i]+val[k]*x[ind[k]]$, essentially calculating the matrix vector multiply kernel noted above for each row of the matrix A. The result is a sum of weighted rows. It should be noted that the calculations associated with each row can be performed in parallel at substantially a same time and thus, may be distributed to different workers.

Figure 8B:
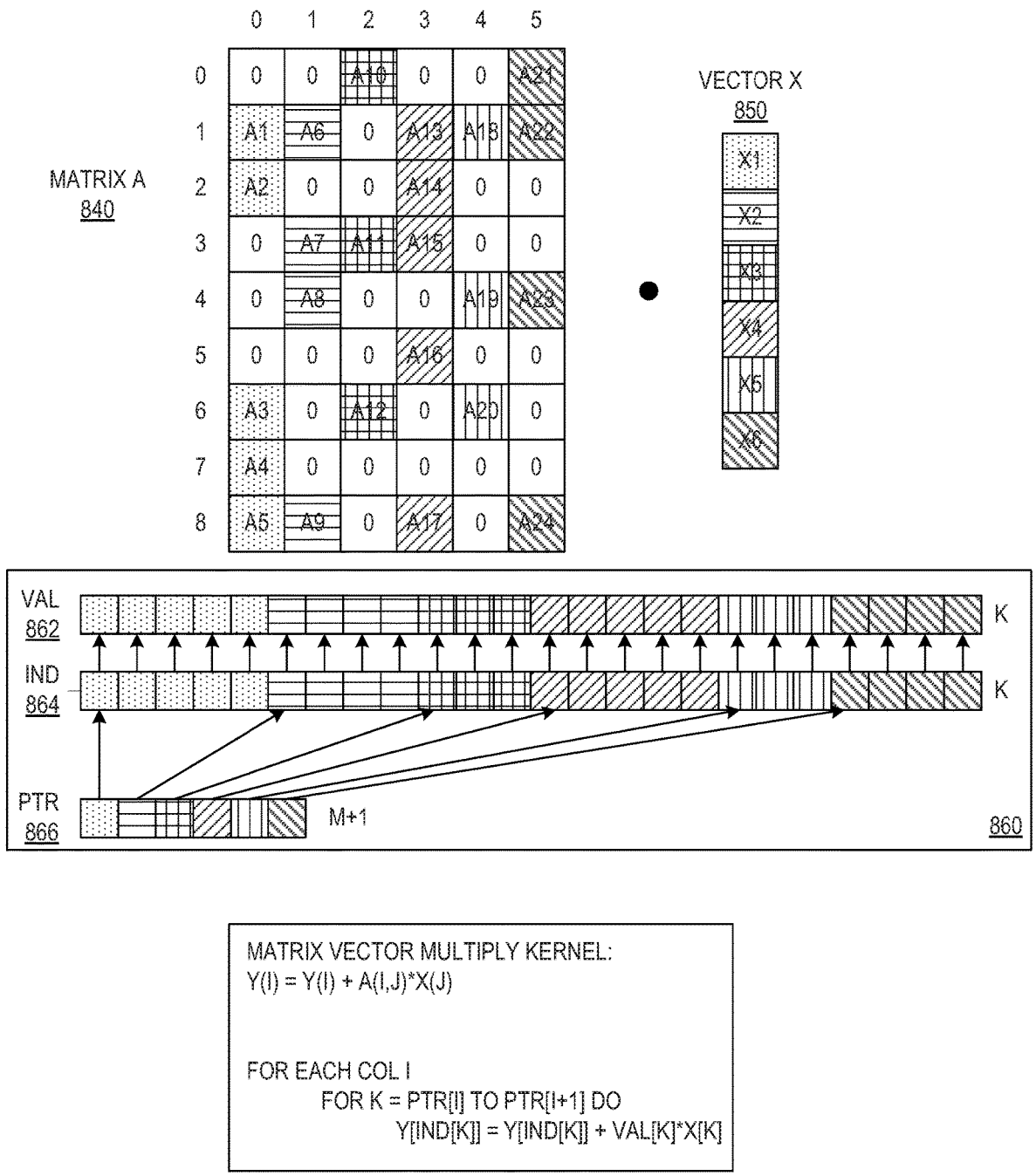
FIG. 8B illustrates a matrix vector multiplication operation performed using a Compact Sparse Column (CSC)

FIG. 8B illustrates a matrix vector multiplication operation performed using a Compact Sparse Column (CSC) formatted data structure of a matrix along with sample pseudo-code for performing the partial matrix vector multiplication operations. As shown in FIG. 8B, the matrix A 840 is multiplied by the vector X 850 such that the kernel of the matrix vector multiplication operation is again $y(i)=y(i)+(A(i,j)*x(j))$ where again i is the row index, j is the column index, y is the partial result of the matrix vector multiplication operation, $A(i,j)$ is the entry at i, j in matrix A, and $x(j)$ is the value in the vector X corresponding to column index j.

As shown in FIG. 8B, the data structure representation 860 of the matrix A 840 comprises a value (val) array or vector 862, a row index (ind) array or vector 864, and a column pointer (ptr) array or vector 864. The val array 862 stores the values of the non-zero entries in the matrix A (left-to-right, then top-to-bottom). Thus, the non-zero values in row 0 of matrix A appear first (as depicted by the shading patterns), followed by the non-zero values in row 1, row 2, and so on. The ind array 864 stores the row indices of the corresponding values in the val array 862. The ptr array 866 stores the pointer to the where the column starts for the values in the ind array 834.

As shown in the pseudo-code for performing the partial matrix vector multiplication operations, for each column i, and for each pointer value k in the ptr array 866, a partial matrix vector multiplication operation result is generated as $y[ind[k]]=y[ind[k]]+val[k]*x[k]$, essentially calculating the matrix vector multiply kernel noted above for each column of the matrix A. This results in a sum of weighted columns. It should be noted that the calculations associated with each vector value x[k] can be distributed for small numbers of non-zero x[k] values to exploit the superposition. Since the x vector can be represented by the sum of many single-entry vectors, their corresponding outputs (y[ ]) can simply be added together for the final output vector.

Thus, while CSR and CSC formatted data structures may be used to represent a large scale sparse matrix in a compact manner within memory, each of these formats provides different levels of efficiency for parallel execution in a data processing system based on the sparsity of the vector with which the matrix is being multiplied in a matrix vector multiplication operation. The CSR representation of the matrix is suitable and more efficient for parallel execution for dense vectors X while the CSC representation of the matrix is suitable and more efficient for sparse vectors X. The illustrative embodiments may leverage this difference in format efficiency to provide a hybrid approach to performing matrix vector multiplication operations. The matrix representation that is utilized in the illustrative embodiments for a particular iteration of the concept analysis operation in the accelerator 520 may be selected dependent upon the sparsity (or density) of the multiplicand vector.

Since knowledge extraction, information extraction, relationship analysis, and other complex processes for obtaining information from large scale networks or matrices utilize multiple iterations of matrix operations, which comprise matrix vector multiplication operations, the density of the vectors by which the matrix is multiplied tends to increase with subsequent iterations. Thus, a vector X, in an initial iteration of process may be rather sparse, while in later iterations the vector X may become denser. For example, an initial iteration may determine "what concepts are related to concept A" which may be determined by multiplying the matrix M by a vector X where the entry in vector X that is a non-zero value is the entry corresponding to concept A. This operation may output a result as an output vector of Y having a plurality of non-zero elements. In order to determine what other concepts may be related to concept A, it is necessary to then multiply matrix M by the vector Y to determine what concepts are related to the concepts in vector Y. As a result, an output vector Z may be generated that includes an even larger set of non-zero elements. This may continue until the difference in number of non-zero elements in the output vector from the previous output vector converges, i.e. does not exceed a predetermined threshold at which point the process is complete and the result is the combination of the vector outputs. Thus, it can be seen that as the vectors X, Y, and Z, etc. become more dense with each subsequent iteration of the process, and hence, different matrix representations may be more efficient for parallel execution of subsequent iterations.

In some illustrative embodiments, the illustrative embodiments dynamically modify the matrix representation used during iterations of the concept analysis operation that is operating on a large scale matrix by either providing a predetermined number of iterations in which a first matrix representation is utilized with subsequent switching to a second matrix representation during subsequent iterations, or providing a mechanism for evaluating the sparsity of the vector of the matrix vector multiplication operations being performed during an iteration of the process with a threshold sparsity value to determine if switching of the matrix representation should be performed. The selection of a matrix representation is made so as to maximize parallel execution of the partial matrix vector multiplication operations that are performed. This dynamic selection is described in greater detail in commonly assigned and co-pending U.S. patent application Ser. No. 14/635,007, but is summarized in the following flowcharts for illustration as to how this process may be implemented in the accelerators 520 of the illustrative embodiments.

FIG. 9 is a flowchart outlining an example hybrid representation matrix vector multiplication operation in accordance with one illustrative embodiment. It should be appreciated that with the process outlined in FIG. 9, the operations 910-920 may be performed by a host system 500, with the remainder of the operations being performed by one or more accelerators 520 on behalf of the host system.

As shown in FIG. 9, the operation starts with receiving a matrix that is the basis for the performance of the matrix vector multiplication operation (step 910). The matrix is a representation of a large scale data set which may in turn represent many different types of relationships between entities, concepts, information, or the like, depending upon the particular system in which the mechanisms of the illustrative embodiments are implemented. For example, the matrix may represent, concepts and relationships between concepts, in one or more electronic documents of a corpus of documents upon which a Question and Answer (QA) system, such as the IBM Watson™ QA system available from International Business Machines (IBM) Corporation of Armonk, N.Y., operates. In such a case, the matrix may be generated as part of an ingestion operation in which the corpus is ingested by the QA system for use in performing question answering operations. The network or graph of the concepts and their relationships may have nodes representing concepts and edges representing relationships between concepts with the strengths of these relationships being indicated by the specific values associated with the edges. This network or graph may then be translated into a matrix representation in which the concepts (nodes) are indices of the matrix while edges are represented as values at locations within the matrix.

Having received the matrix as input, the mechanisms of the illustrative embodiments generate a plurality of compressed representation data structures of the matrix, each compressed representation data structure being for a different type of compressed representation of the matrix (step 920). The compressed representations represent the matrix in a compressed manner, preferably by concentrating the representation on specifying the non-zero values within the matrix and assuming that any values not represented by the compressed representation are zero values. For example, the plurality of compressed representations, in one illustrative embodiment, comprises a CSR representation and a CSC representation. Other representations may also be utilized, including, but not limited to, the Yale sparse matrix representation, for example. In some illustrative embodiments, the compressed representation represents the matrix as a plurality of arrays or vectors that focus on the non-zero values present within the input matrix.

A vector is generated based on an information source, such as a document, input question, or the like, with the vector specifying the entity, concept, information, or the like, of interest (step 930). For example, the vector may have multiple entries for different concepts that can be the basis for the evaluation of the matrix with one of these entries being set to a non-zero value to indicate the particular concept of interest, e.g., concept i in FIG. 9. For example, if the process is to identify all of the concepts that may be related to concept i in the matrix, then the vector entry for concept i may be set to a non-zero value such that when the vector is multiplied by the matrix, only those non-zero values in the matrix associated with concept i will generate non-zero outputs in the output vector, i.e. only those concepts directly related to concept i and thus, having an edge or relationship with concept i will result in a non-zero value being output.

For an initial set of iterations of the process, a first matrix representation data structure is selected for use in performing the partial matrix vector multiplication operations (step 940). In one illustrative embodiment, this first matrix representation may be the CSC matrix representation data structure which, as discussed above, is efficient for sparse vectors. For example, with a vector input that has a single non-zero value in the vector, e.g., concept i, during a first iteration 942 of the process a CSC matrix representation data structure may be selected and CSC based sparse matrix multiplication operations may be performed to generate a partial matrix vector multiplication output. Alternatively, since the vector has only a single non-zero value, a lookup in the CSC formulation data structure may be performed for the i'th vector which is then used as the output for the partial matrix vector multiplication operation of the first iteration.

For a second iteration 944 of the process, the CSC representation data structure may again be utilized to perform a partial matrix vector multiplication operation for this iteration using the vector output of the first iteration as the vector to multiply with the matrix for this second iteration. During this iteration, a weighted sum of columns of the CSC representation data structure based on the output vector of the first iteration is generated. As noted above in the description of the CSC representation with regard to FIG. 8B, the evaluations of x[k] can be distributed for small number of non-zeros in x[k] with the result being a sum of weighted columns. Thus, the second iteration 344 may be parallelized using a plurality of workers.

As shown in FIG. 9, after an initial set of iterations in which the first matrix representation data structure is utilized to perform the partial matrix vector multiplication operations (step 940), matrix vector multiplication operations are performed in a distributed/parallel manner using a second matrix representation data structure which is partitioned into portions for each of the various workers (step 950). For example, in one illustrative embodiment, the second matrix representation data structure may be a CSR representation of the matrix. As discussed above with regard to FIG. 8A, the partial matrix vector multiplication operations for the various rows of the matrix may be distributed to a large number of workers such that the calculations for multiple rows can be performed substantially at the same time.

Hence, in addition to the parallelization of step 940 above, step 950 may be performed in parallel using multiple workers (threads) as well. Thus, parallelization of the matrix vector multiplication operation is maximized through the selection of compressed matrix representations that are suited to the particular sparsity of the vector involved in the iteration of the matrix vector multiplication operation and overall process. The workers may be separate threads in the same accelerator 520 or may be different threads in different accelerators 520 when a plurality of accelerators are utilized.

The parallel partial matrix vector multiplication operations 950 may be repeated until the iterations of the process converge (step 960). Iterations typically converge (step 960) based on monitoring the change in the output vector. If the output vector change becomes very small in relative terms and in magnitude, the iterations are deemed to be converged, and the system generates the output vector (step 970). Based on a benchmark set that typically represents the test cases, the iteration convergence can be also be set as a fixed number of iterations. For example, one could set the number of iterations to 5 based on the benchmark test, where the final output vector is generated upon execution of the fifth iteration.

The resulting vector output generated from the convergence of the iterations is then output as the final result of the process (step 970). For example, if the process was attempting to find concepts related to concept A, then the resulting vector output would have non-zero values in each entry of the vector corresponding to a concept that is related either directly or indirectly with concept A, as determined from the multiple iterations of the matrix vector multiplication operation. As discussed previously, with regard to the accelerators 520 of the illustrative embodiments, the final result output generated by this process may be provided to a normalization engine 526 for normalization and the resulting normalized output may be provided to a post processing engine 528 for further processing before returning a N-element vector 530 result to the host system 500.

While FIG. 9 shows an illustrative embodiment in which a fixed number of initial iterations utilize the first compressed matrix representation data structure while subsequent iterations utilize a second compressed matrix representation, the illustrative embodiments are not limited to such. Rather, the switching from one compressed matrix representation to another may be performed dynamically based on an evaluation of the sparsity of the input vector. It should be appreciated that in an iterative matrix vector multiplication operation, the input vector is the output vector of the previous iteration. Thus, as the sparsity of the input vector decreases and the input vector becomes more dense with each iteration, the compressed matrix representation may be dynamically switched from one compressed matrix representation to another. Looking at it from a vector density perspective, as the density of the input vector increases with each iteration, the compressed matrix representation may be dynamically switched.

FIG. 10 is a flowchart outlining an example operation for dynamically modifying the compressed matrix representation utilized for iterations of a matrix operation based on a determination of the sparsity/density of an input vector using a hybrid matrix representation mechanism in accordance with one illustrative embodiment. As shown in FIG. 10, the operation again starts with receiving a matrix that is the basis for the performance of the matrix vector multiplication operation (step 1010). A plurality of compressed representation data structures of the matrix, each compressed representation data structure being for a different type of compressed representation of the matrix, are again generated and stored for use in performing the matrix operation (step 1020). During an initial iteration, an input vector is generated (step 1030) in a manner similar to that of step 930 in FIG. 9 above.

A next iteration of the matrix operation is then initiated (step 1040). At the start of the matrix operation, the "next iteration" is the first iteration and utilized the vector that is input in step 1030. In subsequent iterations, the input vector will be the output vector generated from the previous iteration of the matrix operation.

The sparsity (or alternatively the density) of the input vector is calculated and compared to one or more sparsity (or density) threshold values (step 1050). It should be appreciated that sparsity and density are alternative sides of the same characteristics. Both measure a relation between zero and non-zero values in the input vector. When the number of zero values in the input vector is greater than the number of non-zero values, the input vector is more sparse, or less dense. When the number of zero values in the input vector is less than the number of non-zero values in the input vector, then the input vector is less sparse, or more dense. Thus, sparsity or density may be evaluated in this operation. Hereafter, it will be assumed that sparsity is utilized for purposes of illustration.

Based on results of the comparison, a corresponding compressed matrix representation data structure is selected for use with the current iteration (step 1060). For example, if the sparsity of the input vector is equal to or greater than a sparsity threshold value, i.e. the vector is sufficiently sparse, then a first compressed matrix representation data structure (e.g., CSC) is selected for use during the present iteration. However, if the sparsity of the input vector is less than the sparsity threshold value, i.e. the input vector is dense, then a second compressed matrix representation data structure (e.g., CSR) is selected for use during the present iteration. Of course this may be extended to additional types of compressed matrix representations based on additional threshold values such that as the density continues to increase, other compressed matrix representations suitable for parallelized execution at higher density input vectors may be selected.

The iteration of the matrix operation is then executed in a parallel manner using the selected compressed matrix representation data structure (step 1070). A determination is made as to whether the iterations have converged (step 1080) and, if not, the operation returns to step 1040 with the input vector now being the output vector of the previous iteration. Otherwise, if the iterations have converged, then the output vector is generated as the aggregate of the output vectors of the partial matrix vector multiplication operations performed during the iterations (step 1090). Thus, the illustrative embodiments may further utilize a hybrid compressed matrix representation based matrix vector multiplication operation mechanism which greatly increases the possibility of parallel execution of the matrix vector multiplication operation and thus, the efficiency with which the overall matrix operation or process is performed.

FIG. 11 is a flowchart outlining an example operation for performing a concept analysis operation utilizing one or more accelerator devices in accordance with one illustrative embodiment. For purposes of the present description, it is assumed that the matrix has already been pre-processed so as to generate one or more compressed format representations of the matrix, e.g., a CSC formatted representation and a CSR formatted representation. As noted above, this needs to be done relatively infrequently.

As shown in FIG. 11, the operation starts with receiving an information source and extracting a listing of concepts identified within the information source (step 1110). The listing of concepts is sent to an accelerator along with one or more matrix representation data structures if the matrix representation data structures have not already been loaded by the accelerator (step 1120). The listing of concepts is processed by an initialization engine of the accelerator to generate one or more input vectors (step 1130). The one or more input vectors are used along with the one or more matrix representation data structures to perform a concept analysis operation (step 1140). As discussed above, this concept analysis operation may involve multiple iterations of a matrix vector multiplication operation in which an initial iteration may utilize the one or more input vectors and one of the matrix representation data structures and subsequent iterations may utilize the resulting vector from the previous iteration and either the same or another matrix representation data structure depending on the density of the vector being utilized. This concept analysis operation may be performed using batch processing with multiple threads in a parallel manner.

The results generated by the concept analysis operation are normalized by a normalization engine of the accelerator (step 1150). The normalized results are then processed by a post processing engine of the accelerator (step 1160) to generate and output an N-element vector (step 1170). The N-element vector is output to the host system which utilizes the N-element vector to perform a knowledge extraction, reasoning, or other analytical operation in the host system (step 1180). The operation then terminates.

Thus, the illustrative embodiments provide mechanisms for improving the execution of concept analysis operations for use with natural language processing (NLP) systems, knowledge extraction systems, or the like. In particular, in some illustrative embodiments, the mechanisms are utilized as part of a Question and Answer (QA) system, such as the IBM Watson™ QA system, to assist with concept analysis operations performed when ingesting documents and/or answering input questions. The mechanisms of the illustrative embodiments provide the ability to offload processing of the concept analysis operations, directed to identifying related concepts within a large scale sparse matrix, to one or more accelerators with minimized data transfer between the host system and the accelerators. Batch processing using massive data parallelism and a plurality of threads in each accelerator also increases the efficiency and speed by which the concept analysis operation is performed. Moreover, using cluster based matrix reordering and hybrid matrix storage formats further improves the efficiency of the concept analysis operation of the accelerators.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a system comprising a host system having a processor and a memory, and at least one accelerator device for performing a concept analysis operation, the method comprising:

providing, by the host system to the accelerator device, a set of one or more concepts extracted from an information source, a first matrix representation data structure and a second matrix representation data structure representing a graph of concepts and relationships between concepts in one or more electronic documents of a corpus of documents, wherein the first matrix representation data structure is a Compact Sparse Column (CSC) formatted data structure and the second matrix representation data structure is a Compact Sparse Row (CSR) formatted data structure;

executing, by the accelerator device, the concept analysis operation internal to the accelerator device to generate an output vector identifying concepts in the corpus of documents related to the set of one or more concepts, wherein executing the concept analysis operation internal to the accelerator device comprises generating, in the accelerator device, an input vector based on the set of one or more concepts, performing a first iteration of the concept analysis operation by performing a partial matrix vector multiplication operation using the first matrix representation data structure and performing a subsequent iteration of the concept analysis operation by performing partial matrix vector multiplication operations in parallel using the second matrix representation data structure; and outputting, by the accelerator device, the output vector to the host system, wherein the host system utilizes the output vector to respond to a request submitted to the host system.

2. The method of claim 1, wherein the accelerator device is a graphics processing unit (GPU) configured with a kernel comprising logic for executing the concept analysis operation.

3. The method of claim 1, wherein executing the concept analysis operation internal to the accelerator device further comprises performing a second iteration of the concept analysis operation by performing a partial matrix vector multiplication operation to multiply a first partial matrix vector multiplication output from the first iteration of the concept analysis operation and the first matrix representation data structure to generate a weighted sum of columns of the first matrix representation data structure.

4. The method of claim 3, wherein executing the concept analysis operation internal to the accelerator device further comprises batch processing the input vector within the accelerator device, wherein the batch processing comprises processing a plurality of batches of input vectors, each batch comprising a set of input vectors corresponding to a memory limit of the accelerator device and each input vector in the set of input vectors comprising at least one concept from the set of one or more concepts.

5. The method of claim 1, wherein executing the concept analysis operation internal to the accelerator device comprises executing the concept analysis operation without storing intermediate results to host system storage.

6. The method of claim 1, wherein executing the concept analysis operation internal to the accelerator device further comprises normalizing results of the matrix vector multiplication operation and performing a post-processing ranking operation to rank concepts according to non-zero values specified in the output vector.

7. The method of claim 1, further comprising:
receiving, in the host system, the request from a user in association with the information source, wherein the information source includes a personal profile of the user; and
responding, by the host system, to the request from the user based on the output vector output to the host system, wherein the host system responds to the request by performing a personalized ranking of concepts in the corpus according to the personal profile of the user based on the output vector.

8. The method of claim 1, further comprising:
receiving, in the host system, the request;
storing, by the host system, the output vector in association with the information source, wherein each portion of information in the corpus has an associated vector specifying concepts related to concepts extracted from the portion of information; and
responding, by the host system, to the request based on the output vector output to the host system, wherein the host system responds to the request by comparing the output vector to vectors associated with portions of information in the corpus to identify portions of information in the corpus that are similar to the information source.

9. The method of claim 1, wherein the host system is a Question and Answer (QA) system, the information source is a natural language question submitted to the QA system by a user, and the QA system utilizes the output vector to generate candidate answers to the input question and rank the candidate answers.

10. The method of claim 1, wherein the request is one of a natural language question input to the host system for answering by the host system, a search request input to the host system requesting a search of the corpus for electronic documents related to search concepts, or a request to add a document in the corpus.

11. A computer program product comprising a non-transitory computer readable storage medium having a computer readable program stored therein, wherein the computer readable program, when executed on a data processing system comprising a host system and an accelerator device, causes the data processing system to:
provide, by the host system to the accelerator device, a set of one or more concepts extracted from an information source, a first matrix representation data structure and a second matrix representation data structure representing a graph of concepts and relationships between concepts in one or more electronic documents of a corpus of documents, wherein the first matrix representation data structure is a Compact Sparse Column (CSC) formatted data structure and the second matrix representation data structure is a Compact Sparse Row (CSR) formatted data structure;
execute, by the accelerator device, a concept analysis operation internal to the accelerator device to generate an output vector identifying concepts in the corpus of documents related to the set of one or more concepts, wherein executing the concept analysis operation internal to the accelerator device comprises generating, in the accelerator device, an input vector based on the set of one or more concepts, performing a first iteration of the concept analysis operation by performing a partial matrix vector multiplication operation to multiply the input vector and the first matrix representation data structure, and performing a subsequent iteration of the concept analysis operation by performing partial matrix vector multiplication operations in parallel using the second matrix representation data structure; and
output, by the accelerator device, the output vector to the host system, wherein the host system utilizes the output vector to respond to a request submitted to the host system.

12. The computer program product of claim 11, wherein the accelerator device is a graphics processing unit (GPU) configured with a kernel comprising logic for executing the concept analysis operation.

13. The computer program product of claim 11, wherein the computer readable program further causes the data processing system to execute the concept analysis operation internal to the accelerator device at least by performing a second iteration of the concept analysis operation by performing a partial matrix vector multiplication operation to multiply a first partial matrix vector multiplication output from the first iteration of the concept analysis operation and the first matrix representation data structure to generate a weighted sum of columns of the first matrix representation data structure.

14. The computer program product of claim 13, wherein the computer readable program further causes the data processing system to execute the concept analysis operation internal to the accelerator device at least by batch processing the input vector within the accelerator device, wherein the batch processing comprises processing a plurality of batches of input vectors, each batch comprising a set of input vectors corresponding to a memory limit of the accelerator device and each input vector in the set of input vectors comprising at least one concept from the set of one or more concepts.

15. The computer program product of claim 11, wherein the computer readable program further causes the data processing system to execute the concept analysis operation internal to the accelerator device at least by executing the concept analysis operation without storing intermediate results to host system storage.

16. The computer program product of claim 11, wherein the computer readable program further causes the data processing system to execute the concept analysis operation internal to the accelerator device further at least by normalizing results of the matrix vector multiplication operation and performing a post-processing ranking operation to rank concepts according to non-zero values specified in the output vector.

17. The computer program product of claim 11, wherein the computer readable program further causes the data processing system to:
  receive, in the host system, the request from a user in association with the information source, wherein the information source includes a personal profile of the user; and
  respond, by the host system, to the request from the user based on the output vector output to the host system, wherein the host system responds to the request by performing a personalized ranking of concepts in the corpus according to the personal profile of the user based on the output vector.

18. The computer program product of claim 11, wherein the computer readable program further causes the data processing system to:
  receive, in the host system, the request;
  store, by the host system, the output vector in association with the information source, wherein each portion of information in the corpus has an associated vector specifying concepts related to concepts extracted from the portion of information; and
  respond, by the host system, to the request based on the output vector output to the host system, wherein the host system responds to the request by comparing the output vector to vectors associated with portions of information in the corpus to identify portions of information in the corpus that are similar to the information source.

19. The computer program product of claim 11, wherein the host system is a Question and Answer (QA) system, the information source is a natural language question submitted to the QA system by a user, and the QA system utilizes the output vector to generate candidate answers to the input question and rank the candidate answers.

20. An apparatus comprising:
  a host system comprising at least one processor and a memory coupled to the processor; and
  an accelerator device coupled to the host system, wherein the memory comprises instructions which, when executed by the at least one processor of the host system, causes the host system to:
  provide to the accelerator device a set of one or more concepts extracted from an information source, a first matrix representation data structure and a second matrix representation data structure representing a graph of concepts and relationships between concepts in one or more electronic documents of a corpus of documents, wherein the first matrix representation data structure is a Compact Sparse Column (CSC) formatted data structure and the second matrix representation data structure is a Compact Sparse Row (CSR) formatted data structure, and wherein the accelerator device is configured to:
  execute a concept analysis operation internal to the accelerator device to generate an output vector identifying concepts in the corpus of documents related to the set of one or more concepts, wherein executing the concept analysis operation internal to the accelerator device comprises generating, in the accelerator device, an input vector based on the set of one or more concepts, performing a first iteration of the concept analysis operation by performing a partial matrix vector multiplication operation to multiply the input vector and the first matrix representation data structure, and performing a subsequent iteration of the concept analysis operation by performing partial matrix vector multiplication operations in parallel using the second matrix representation data structure; and
  output the output vector to the host system, wherein the host system is further configured to utilize the output vector to respond to a request submitted to the host system.

* * * * *